US012562192B2

(12) United States Patent
Kawabe

(10) Patent No.: US 12,562,192 B2
(45) Date of Patent: Feb. 24, 2026

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takayuki Kawabe, Sagamihara Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/792,391

(22) Filed: Aug. 1, 2024

(65) Prior Publication Data
US 2025/0316290 A1      Oct. 9, 2025

(51) Int. Cl.
G11B 19/04        (2006.01)
G11B 5/82        (2006.01)

(52) U.S. Cl.
CPC .............. G11B 19/048 (2013.01); G11B 5/82 (2013.01)

(58) Field of Classification Search
None
See application file for complete search history.

(56) References Cited

U.S. PATENT DOCUMENTS

| | | | | |
|---|---|---|---|---|
| 6,947,249 | B1 * | 9/2005 | Hargarten | .......... G11B 5/59627 360/77.07 |
| 7,369,343 | B1 * | 5/2008 | Yeo | ...................... G11B 19/041 |

| | | | | |
|---|---|---|---|---|
| 7,562,282 | B1 * | 7/2009 | Rothberg | ........... G11B 20/1883 714/784 |
| 9,236,087 | B1 | 1/2016 | Dahlberg | |
| 9,355,667 | B1 | 5/2016 | Santee et al. | |
| 10,748,567 | B1 | 8/2020 | Zaitsu et al. | |
| 10,910,013 | B1 | 2/2021 | Kawabe et al. | |
| 11,393,500 | B1 * | 7/2022 | Kashiwagi | .............. G11B 5/09 |
| 2002/0110071 | A1 * | 8/2002 | Oki | ................... G11B 20/1866 360/40 |
| 2007/0150774 | A1 * | 6/2007 | Seng | ................. G11B 20/1217 |
| 2018/0261248 | A1 * | 9/2018 | Jun | ....................... G11B 20/18 |
| 2019/0378543 | A1 | 12/2019 | Maeto et al. | |
| 2020/0090699 | A1 | 3/2020 | Kashiwagi et al. | |
| 2022/0301584 | A1 * | 9/2022 | Tagami | .................. G11B 5/012 |
| 2023/0260540 | A1 | 8/2023 | Maeto | |

FOREIGN PATENT DOCUMENTS

| | | |
|---|---|---|
| JP | 2019-215943 A | 12/2019 |
| JP | 2020-042888 A | 3/2020 |
| JP | 2021-047946 A | 3/2021 |
| JP | 2023-119547 A | 8/2023 |

* cited by examiner

*Primary Examiner* — Peter Vincent Agustin
(74) *Attorney, Agent, or Firm* — Knobbe, Martens, Olson & Bear, LLP

(57)        ABSTRACT

According to one embodiment, a magnetic disk device includes a disk, a write head, a write processing unit, an error correction unit, a correction limit prediction unit, and a determination unit. During a write period in which the write processing is executed on the second data track, the correction limit prediction unit is capable of determining whether or not data of each of the target sectors of the first data track is damaged, and generates prediction information, and the determination unit determines whether or not to cause the write processing unit to continue the write processing on the second data track based on the prediction information.

18 Claims, 25 Drawing Sheets

Plurality of target sectors of first data track

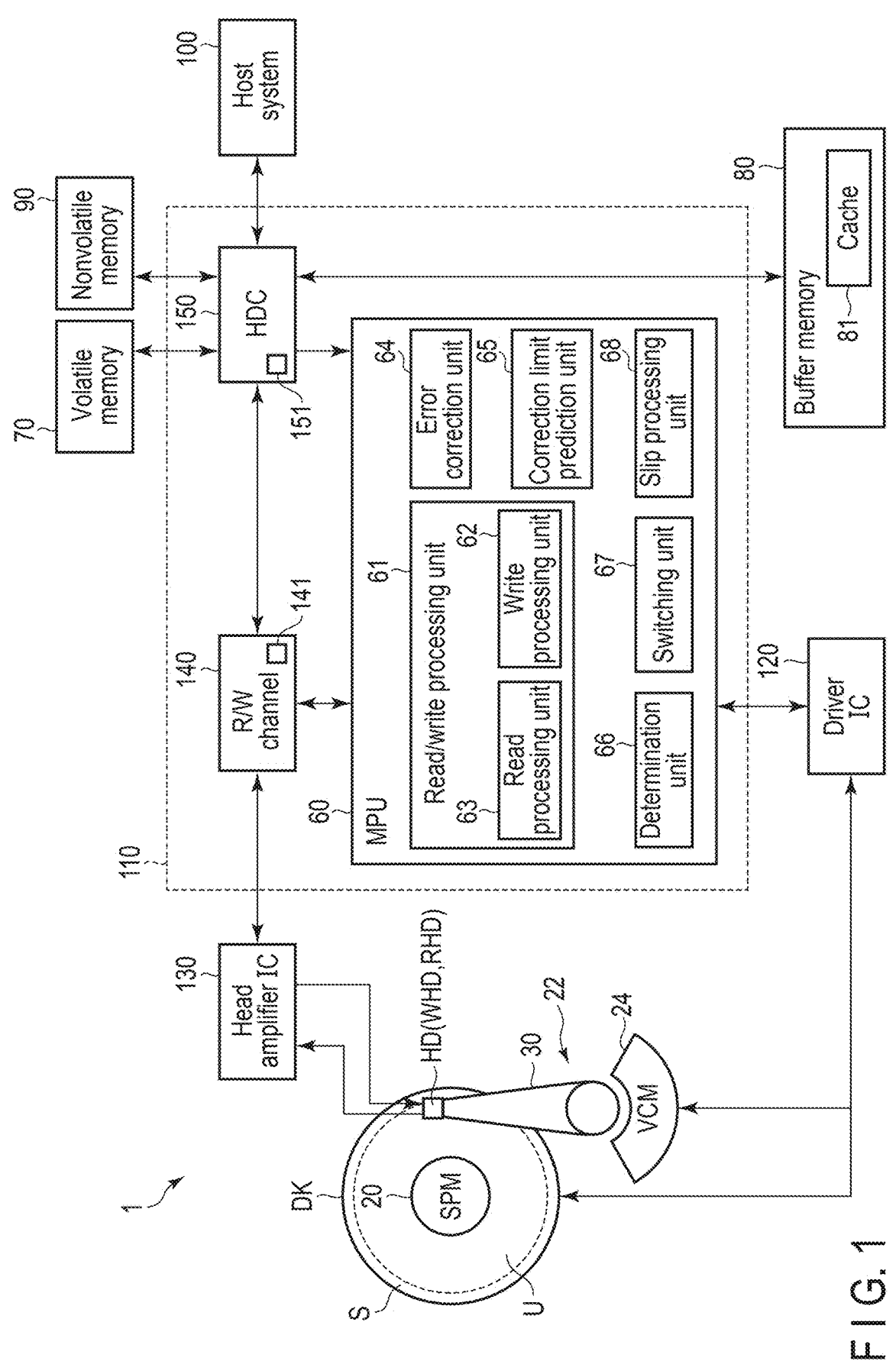
F I G. 1

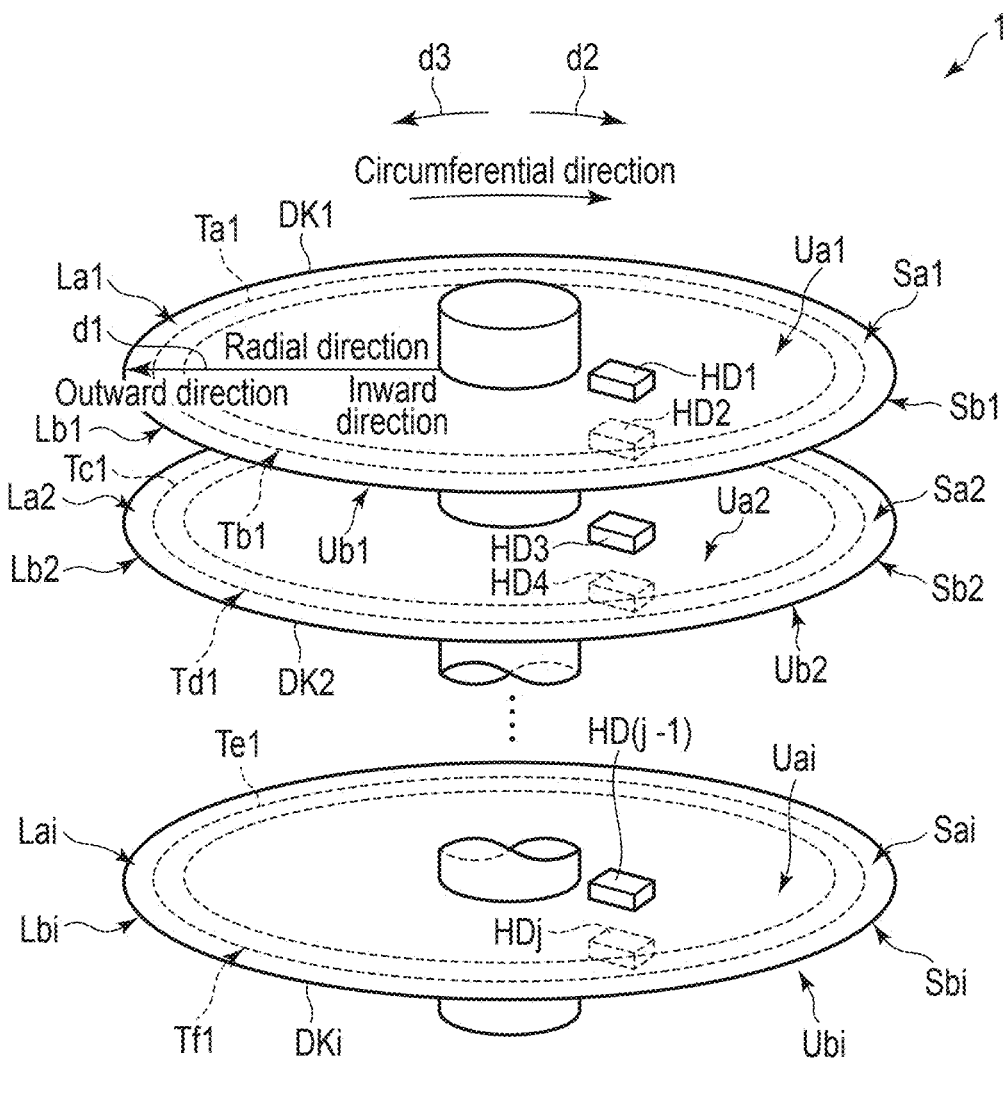
F I G. 2

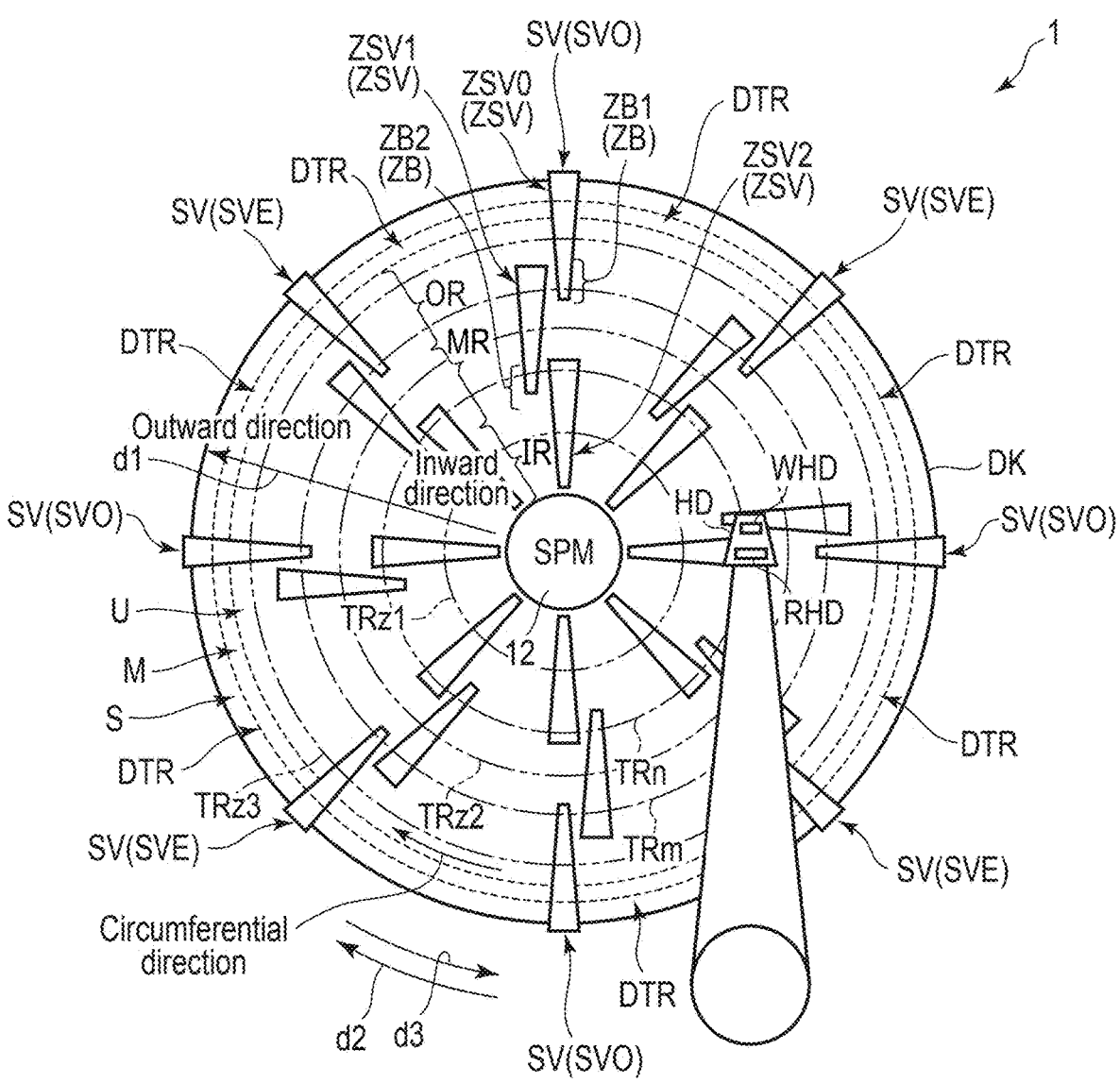
F I G. 3

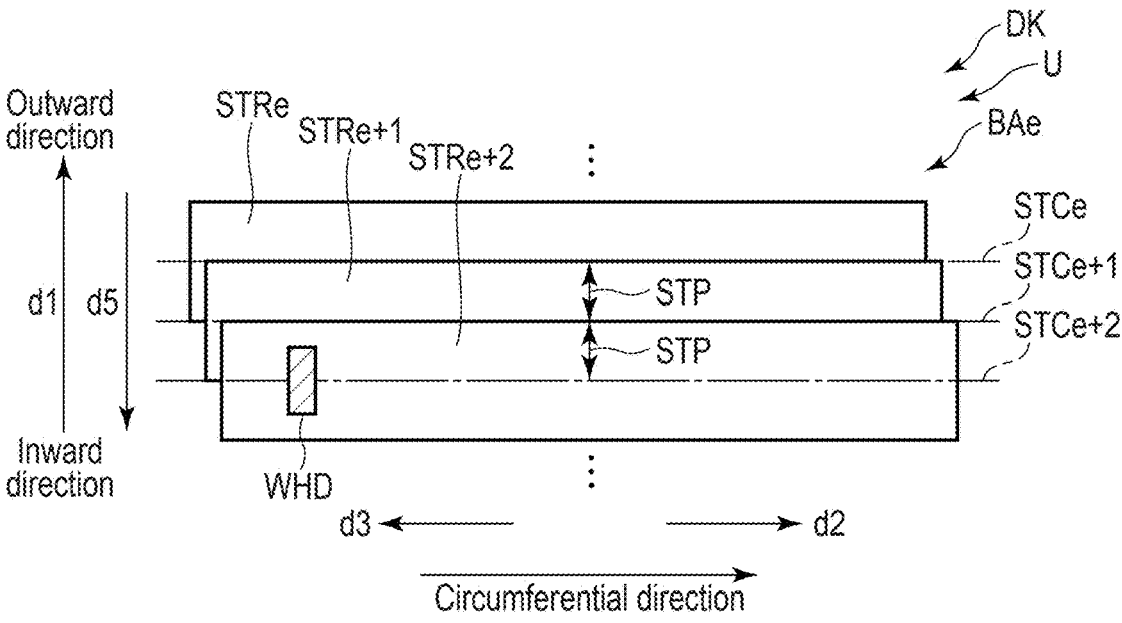
F I G. 4
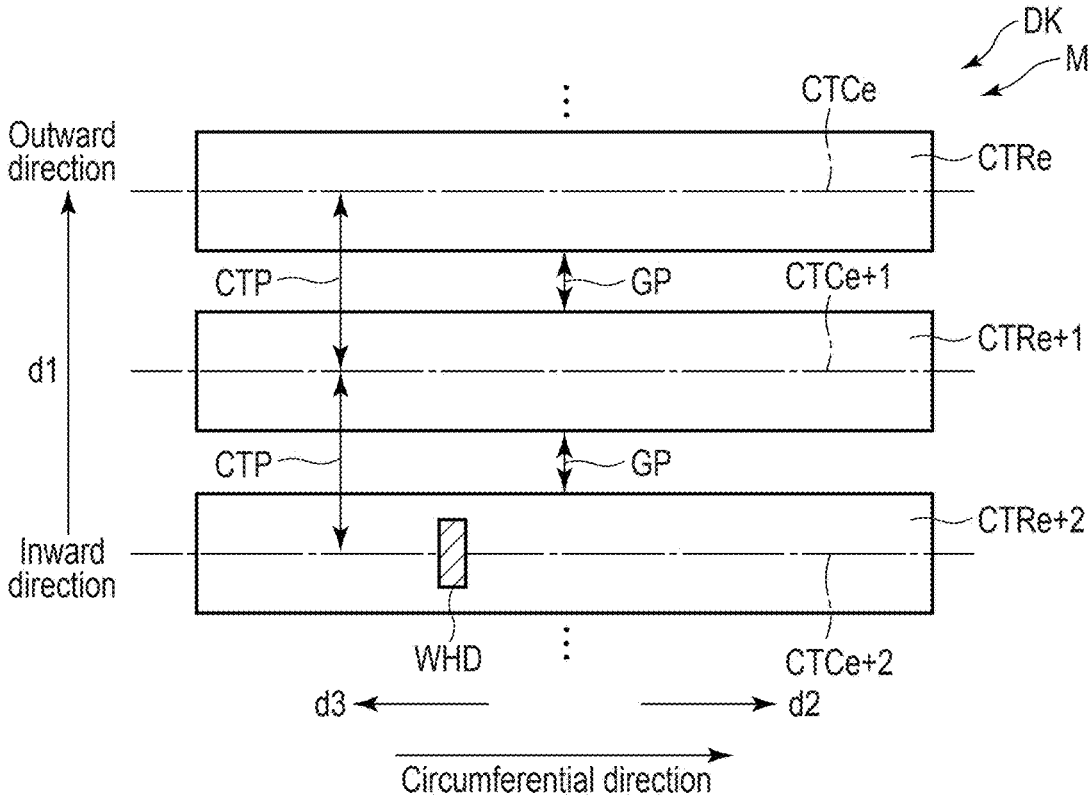
F I G. 5

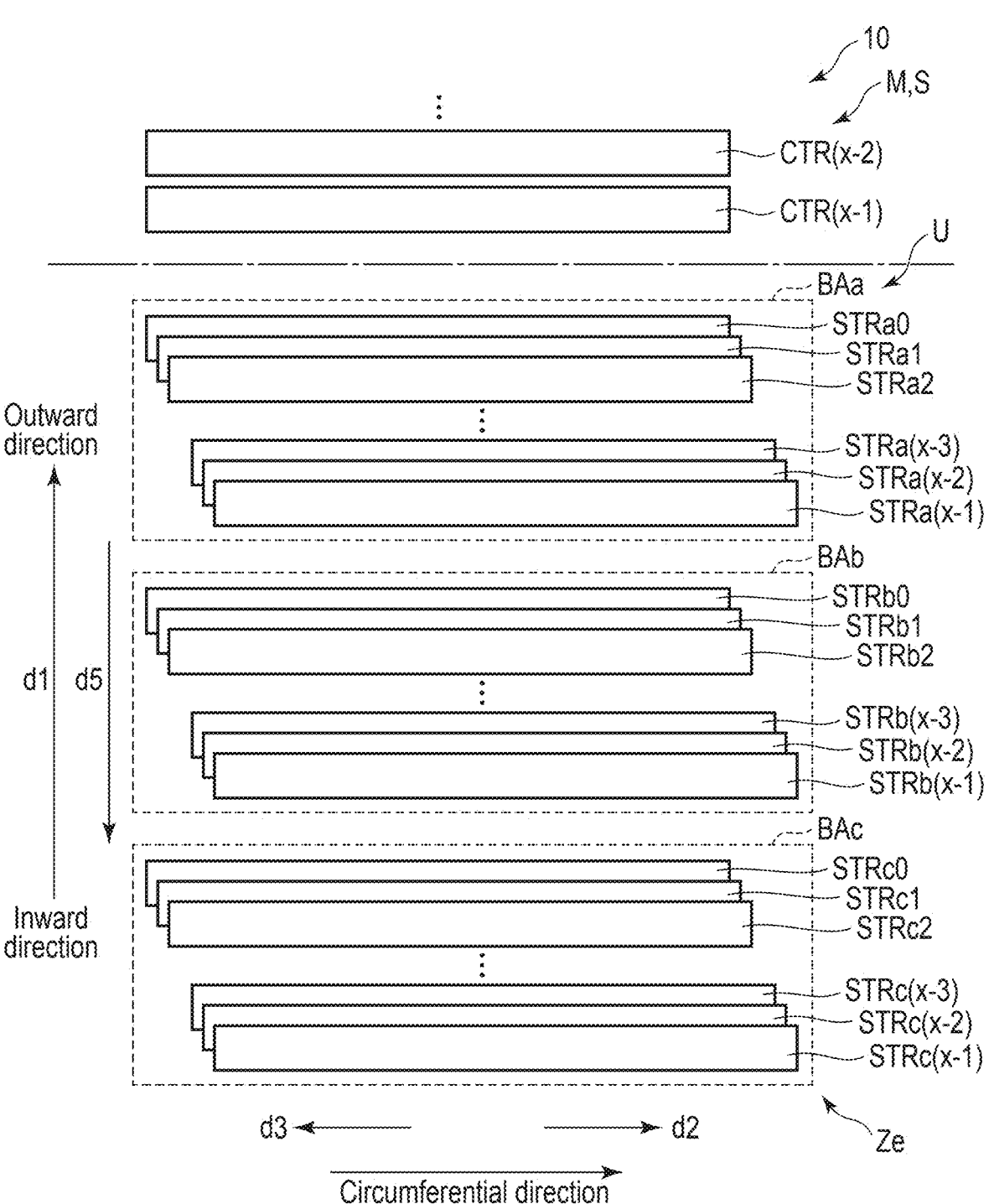
F I G. 6

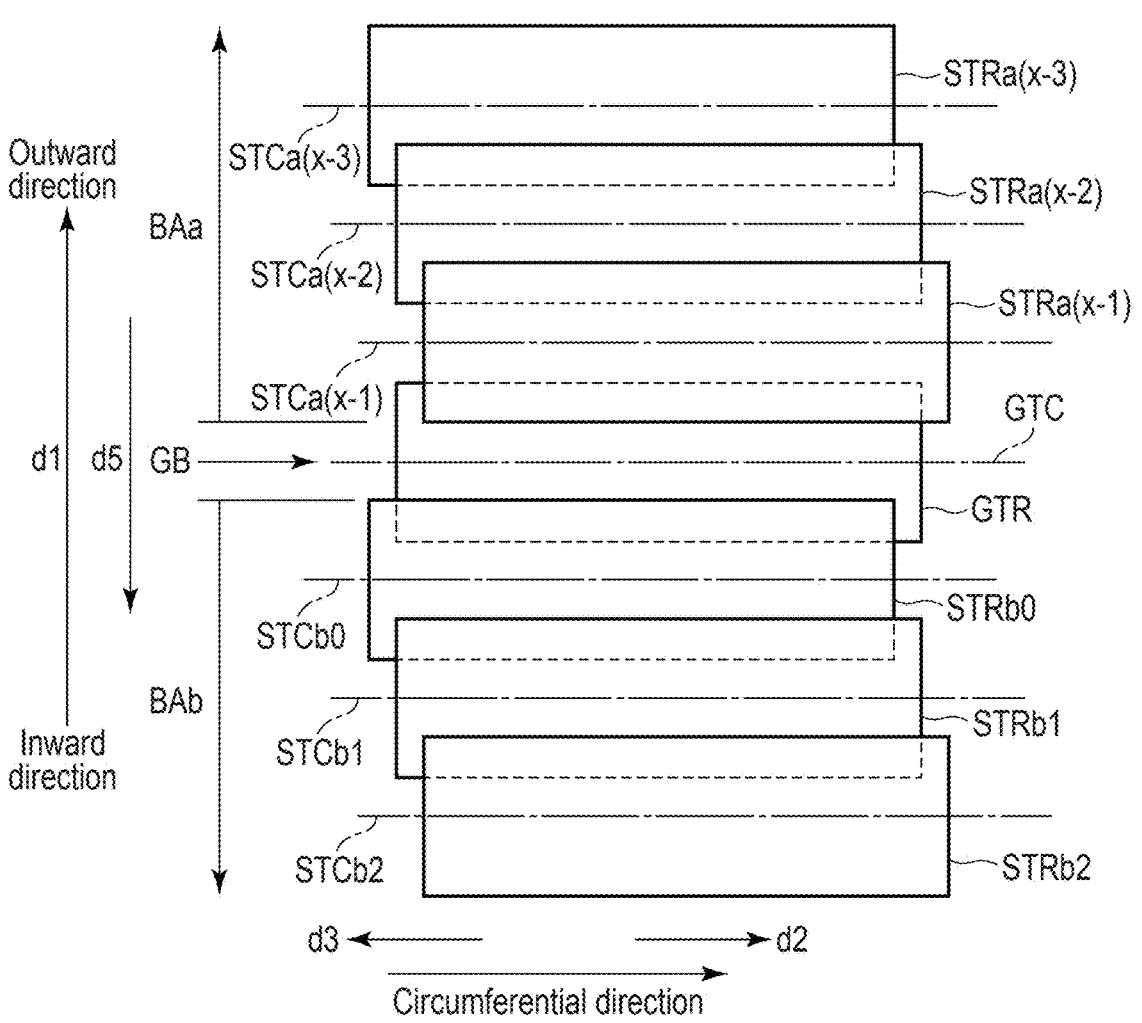
F I G. 7
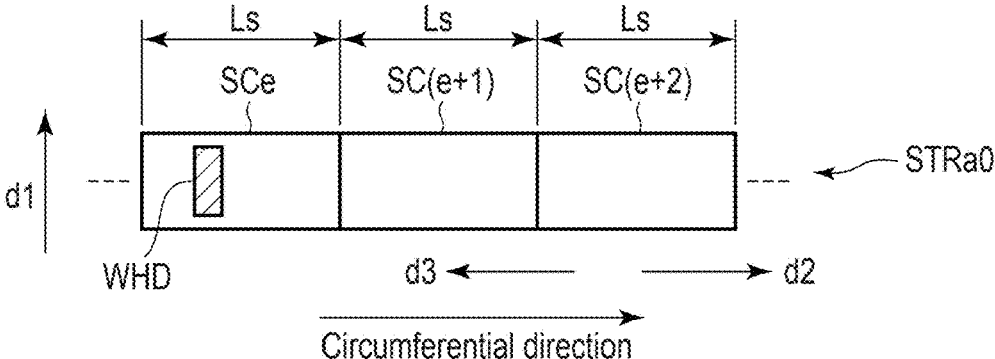
F I G. 8

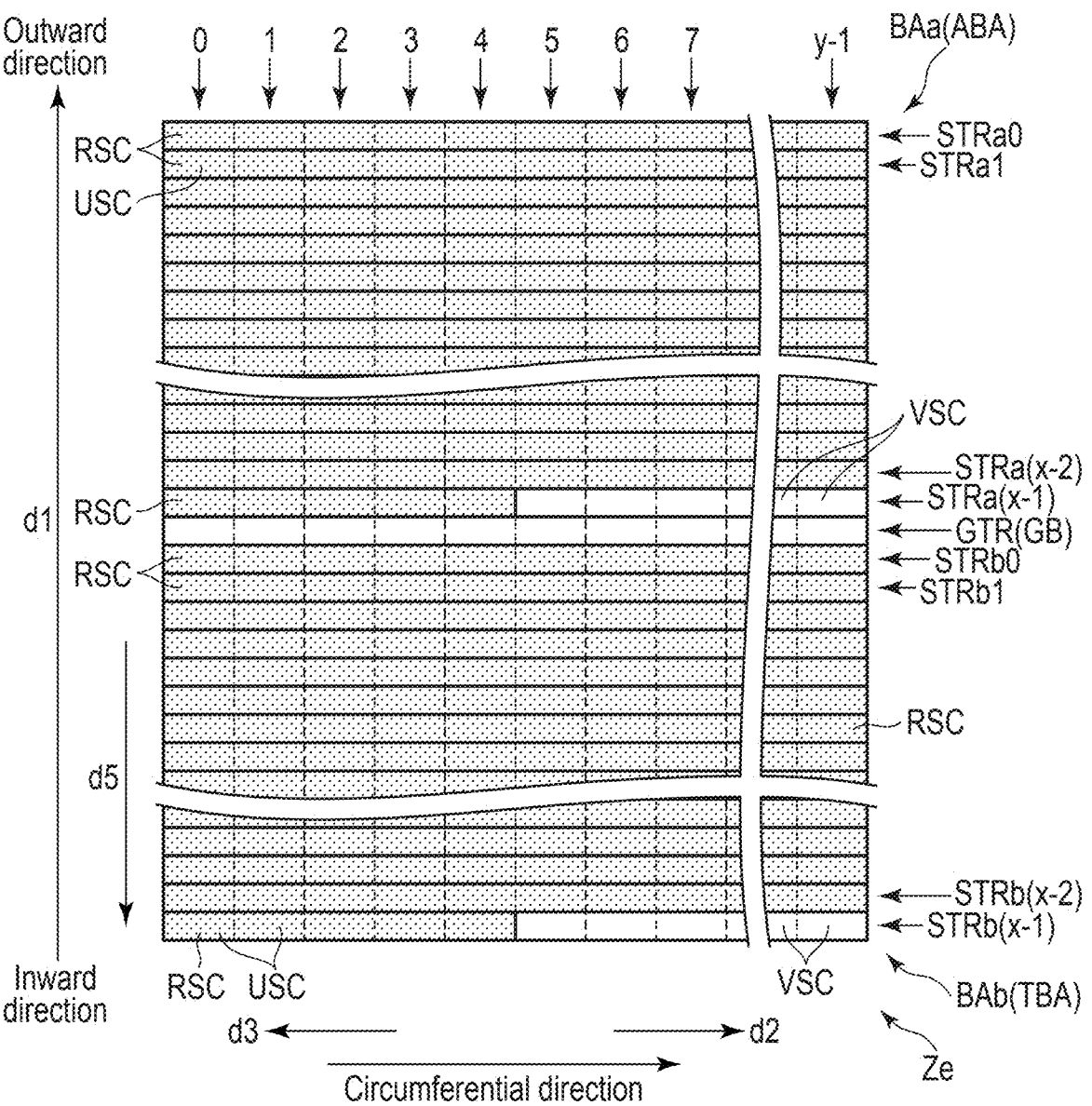
F I G. 9

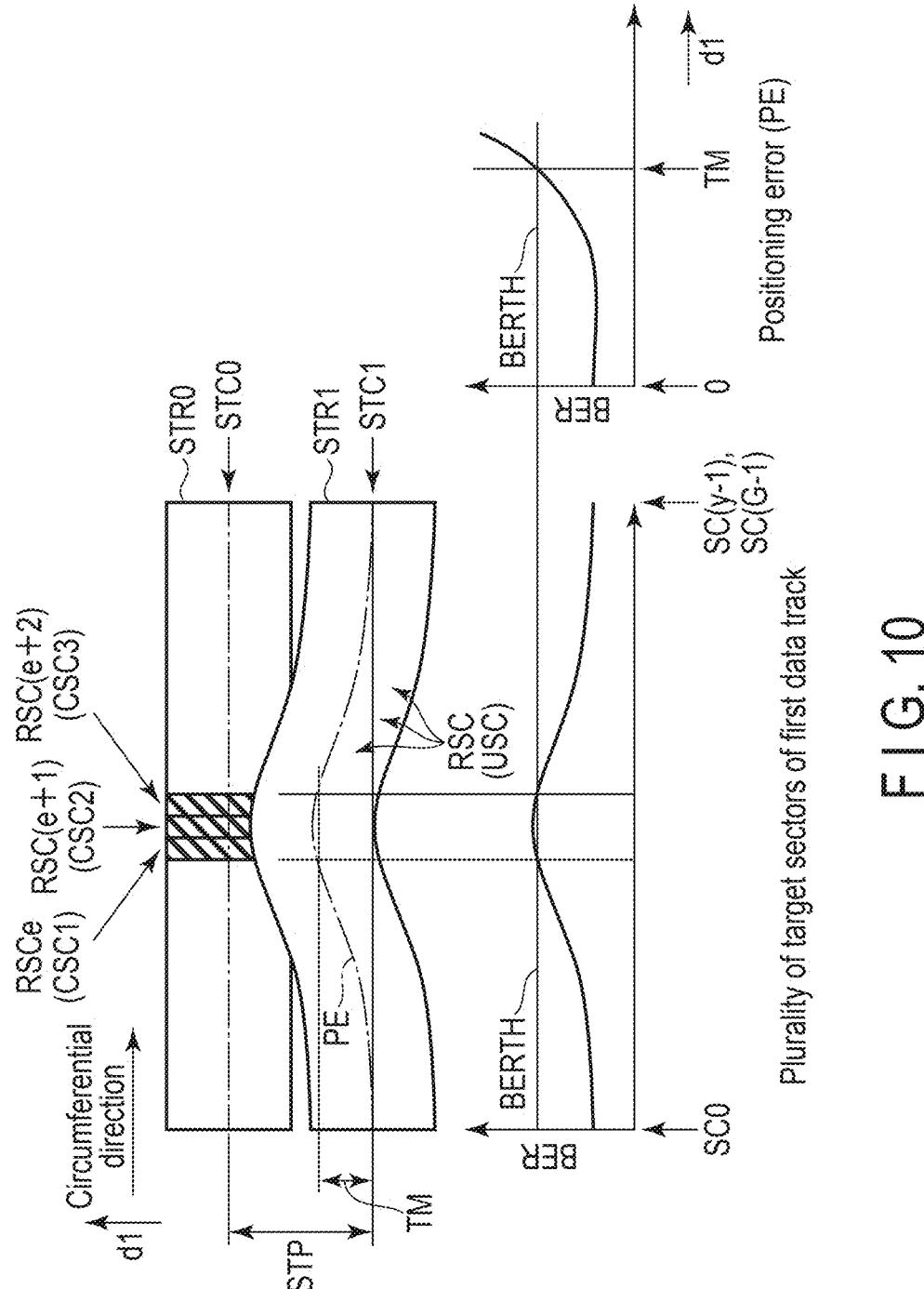
F I G. 10

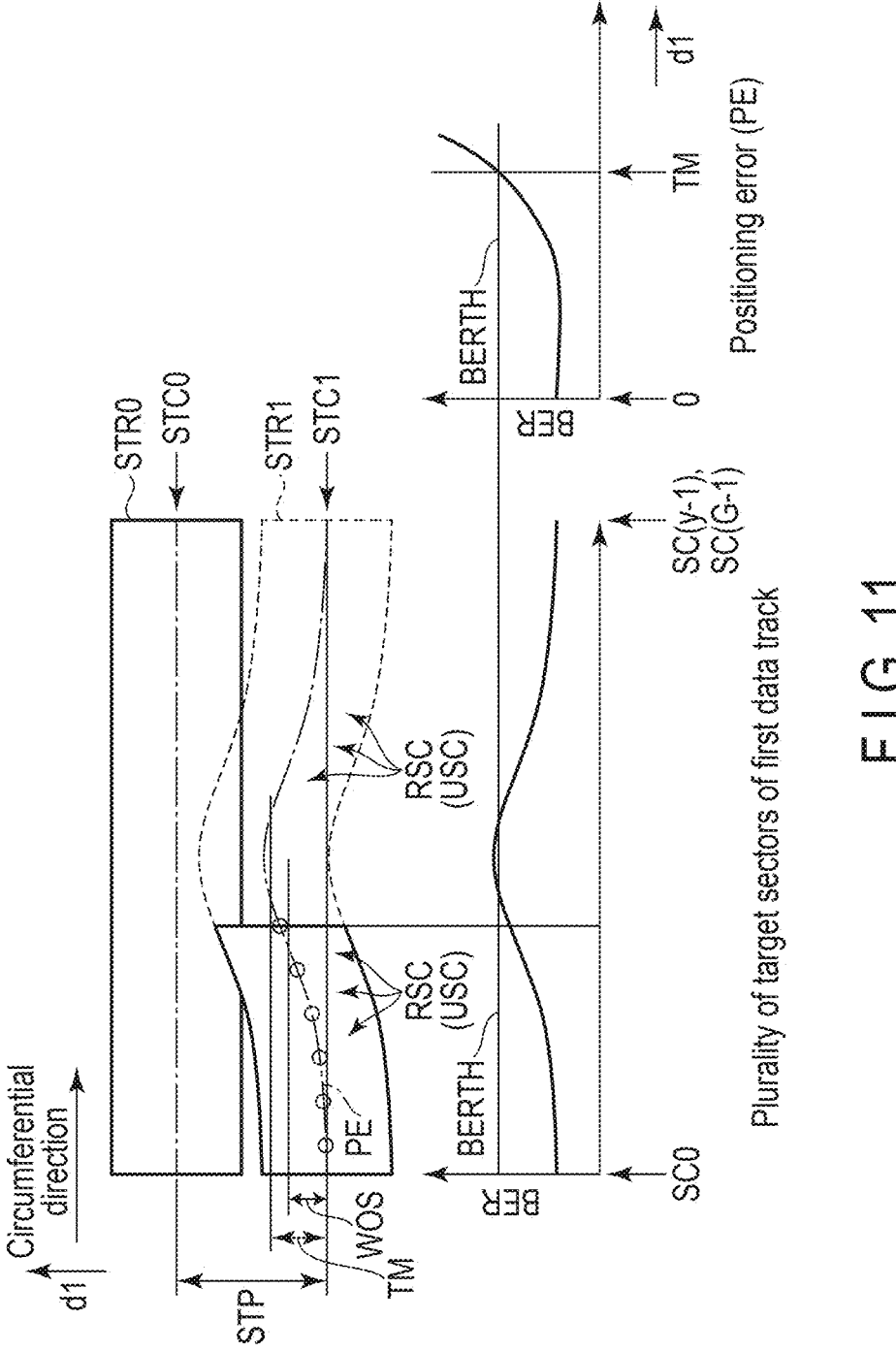
F I G. 11

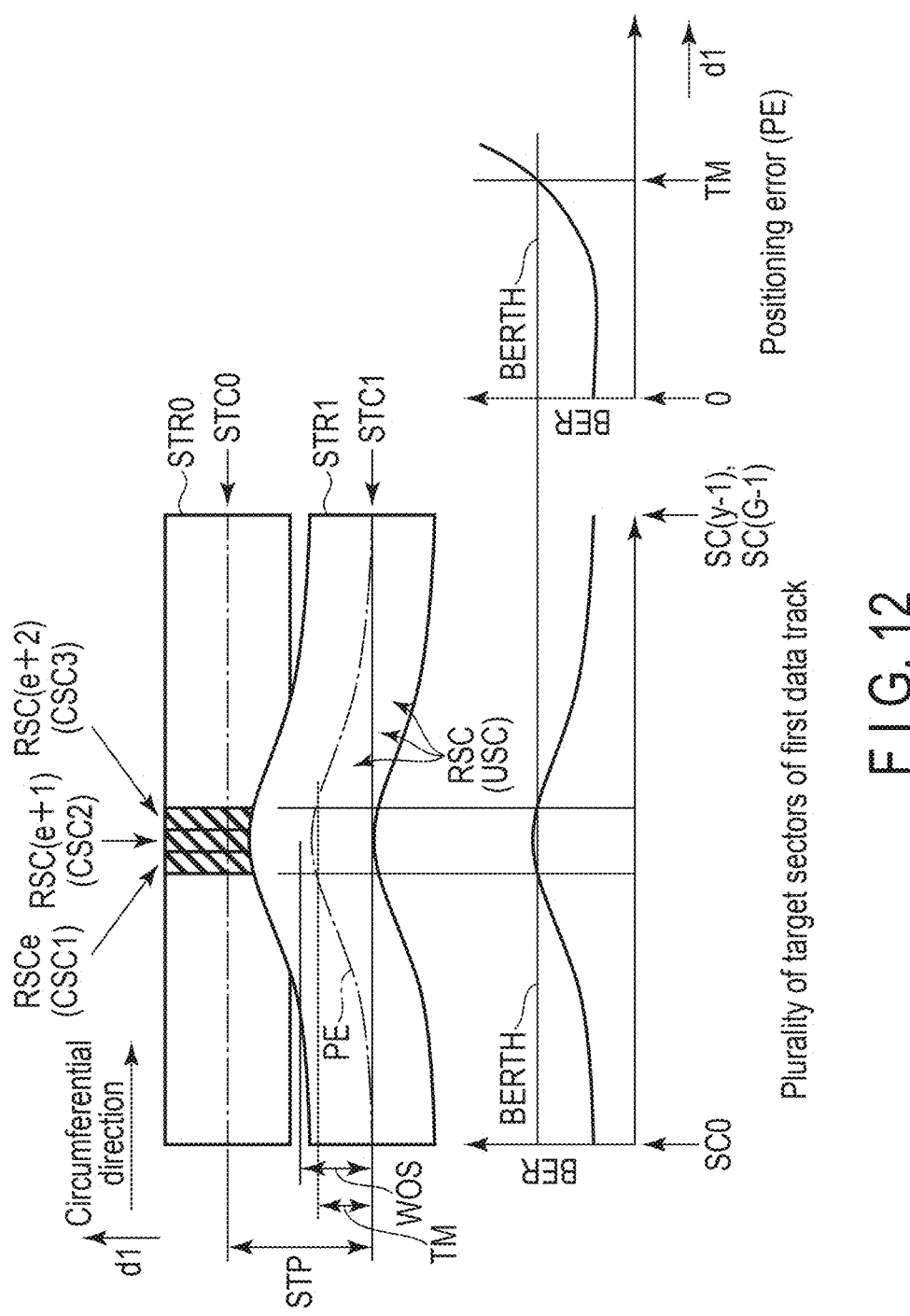
F I G. 12

Plurality of target sectors of first data track

Plurality of target sectors of first data track

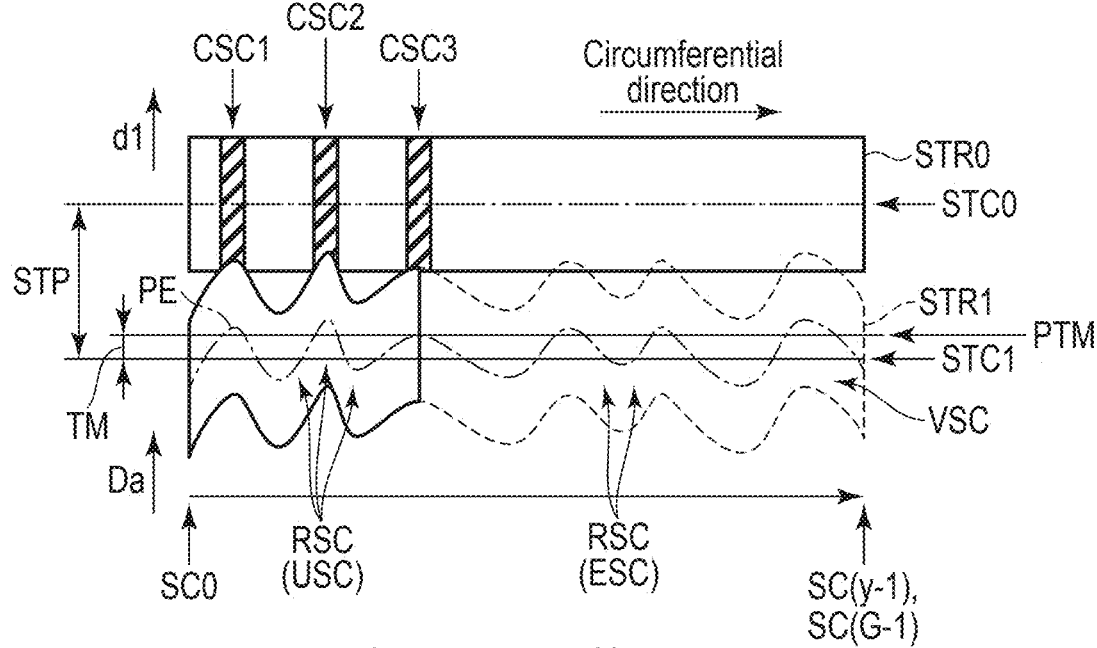
Plurality of target sectors of first data track
F I G. 15

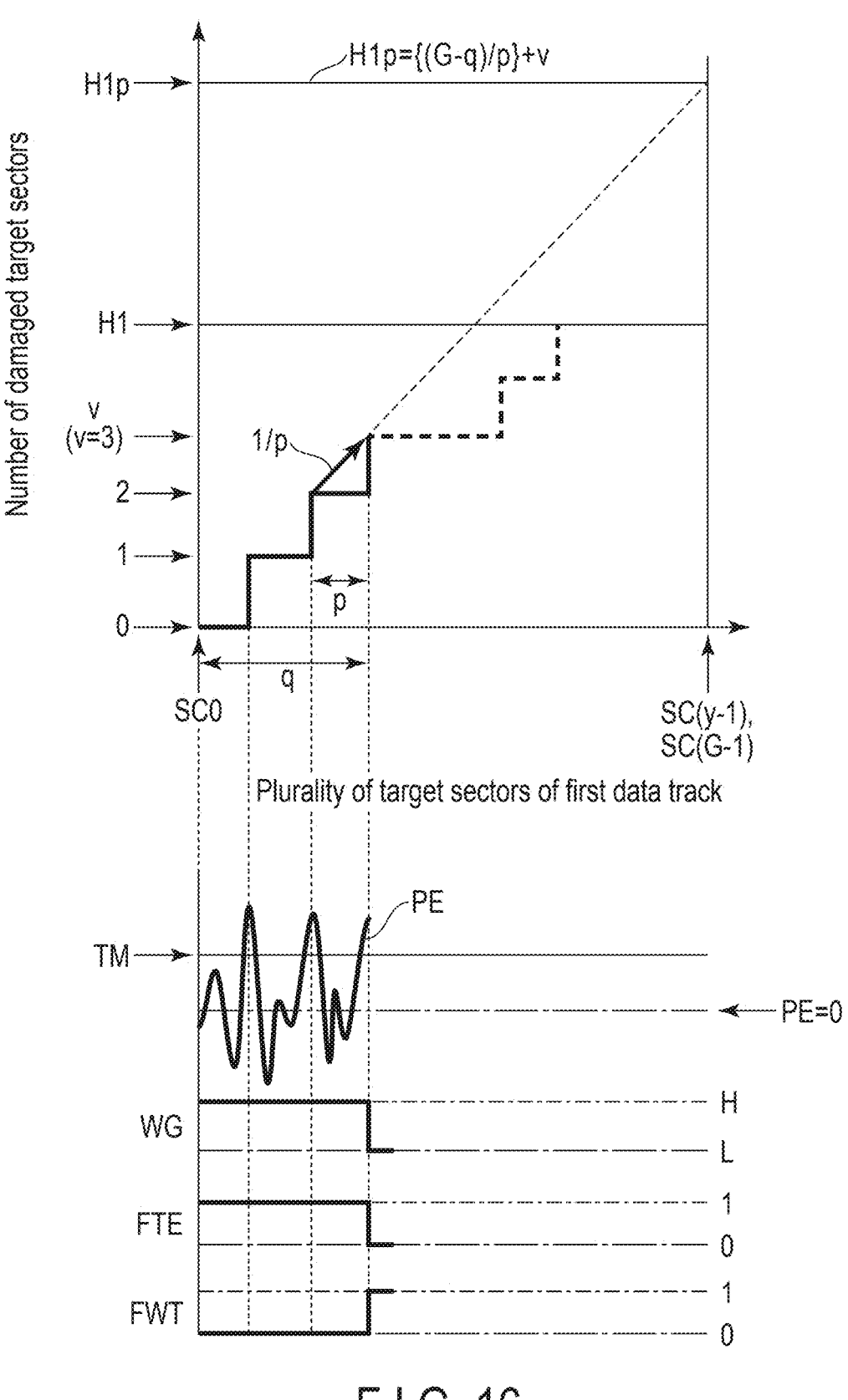
F I G. 16

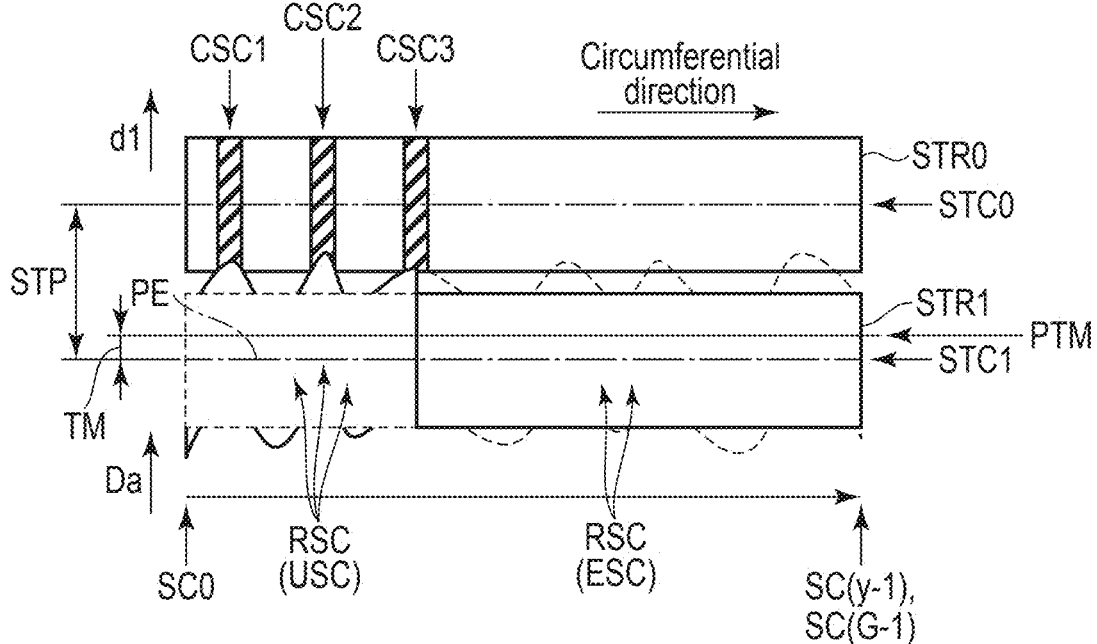
Plurality of target sectors of first data track
F I G. 17

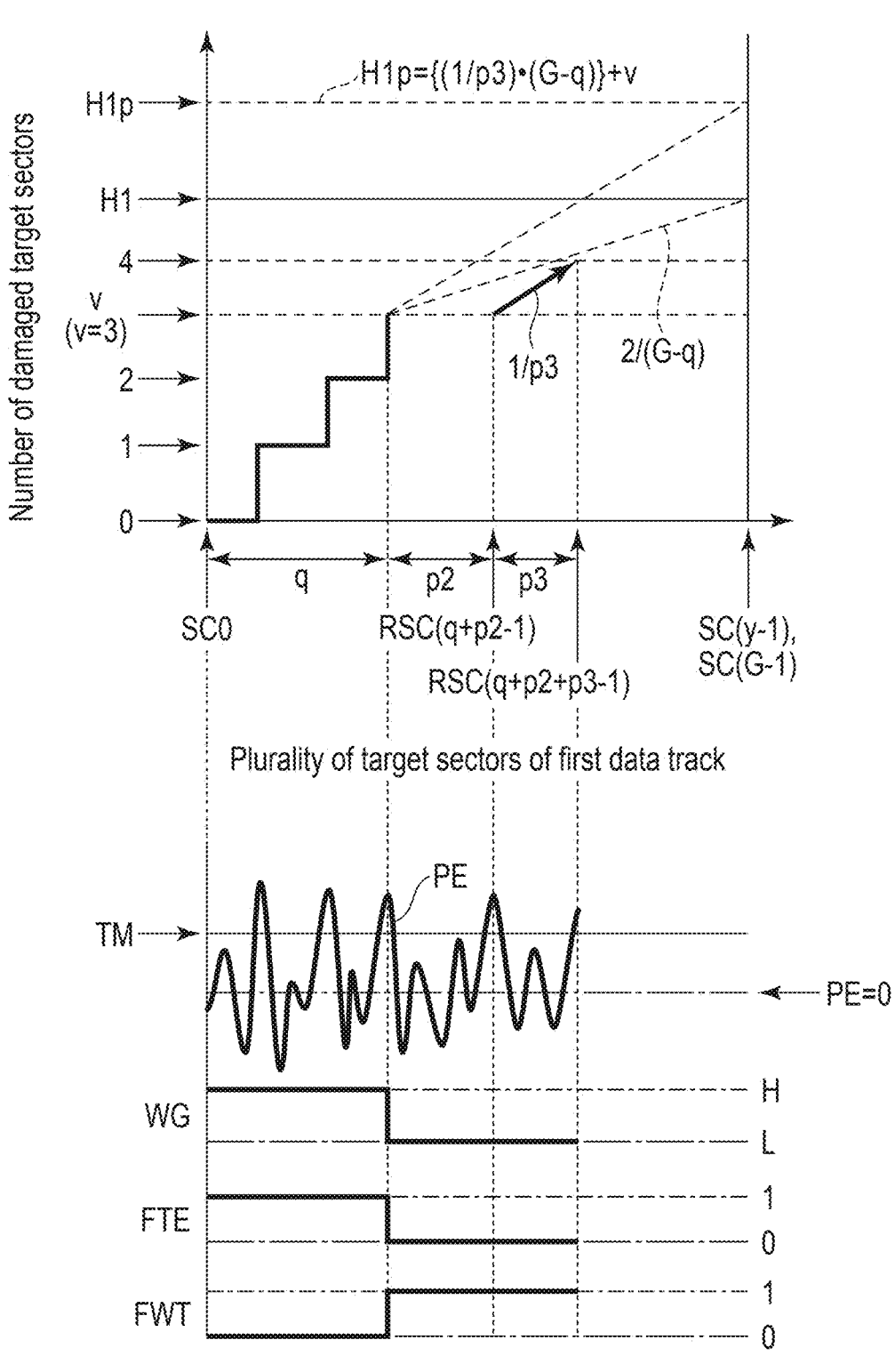
F I G. 18B

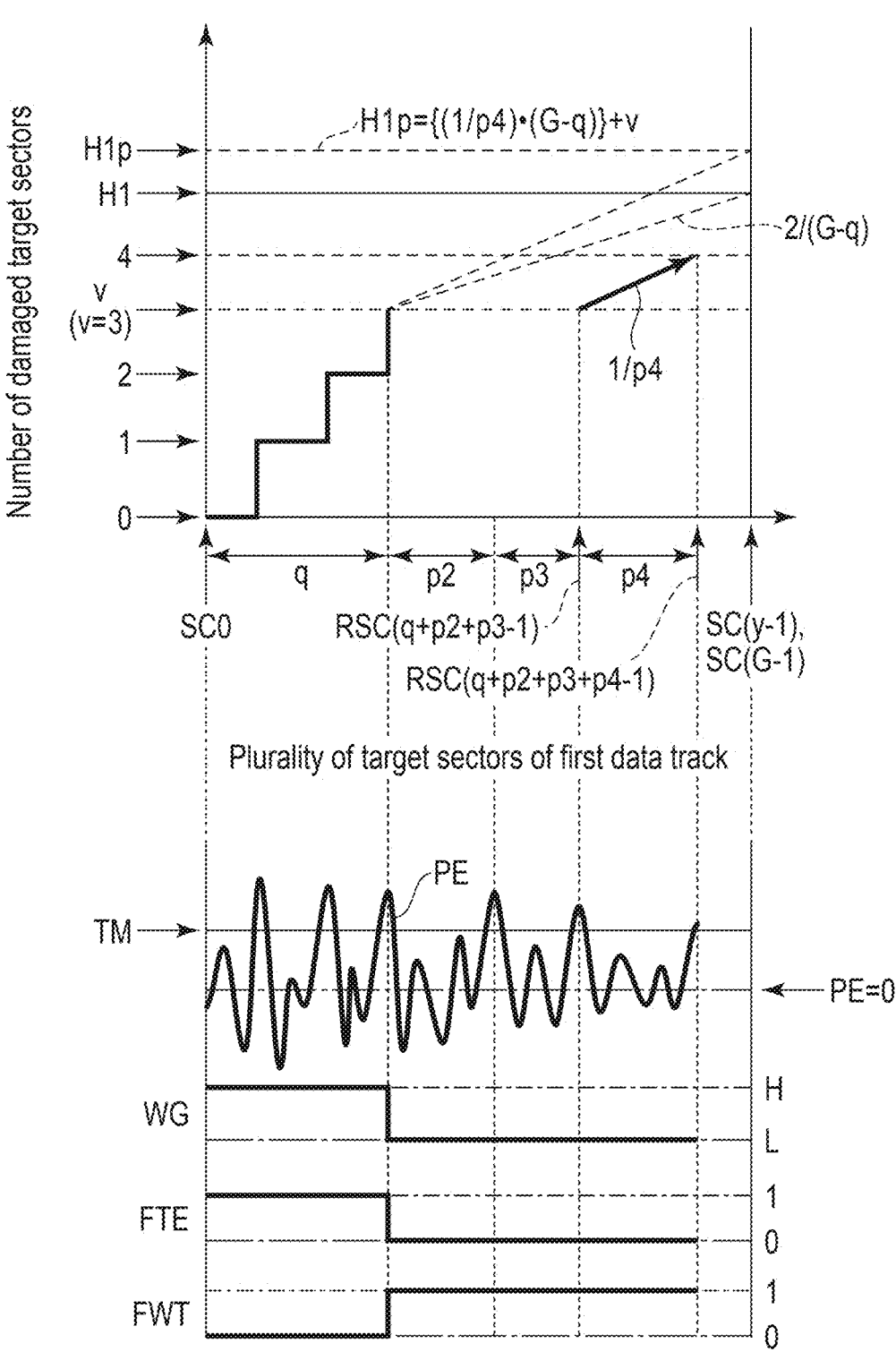
F I G. 18C

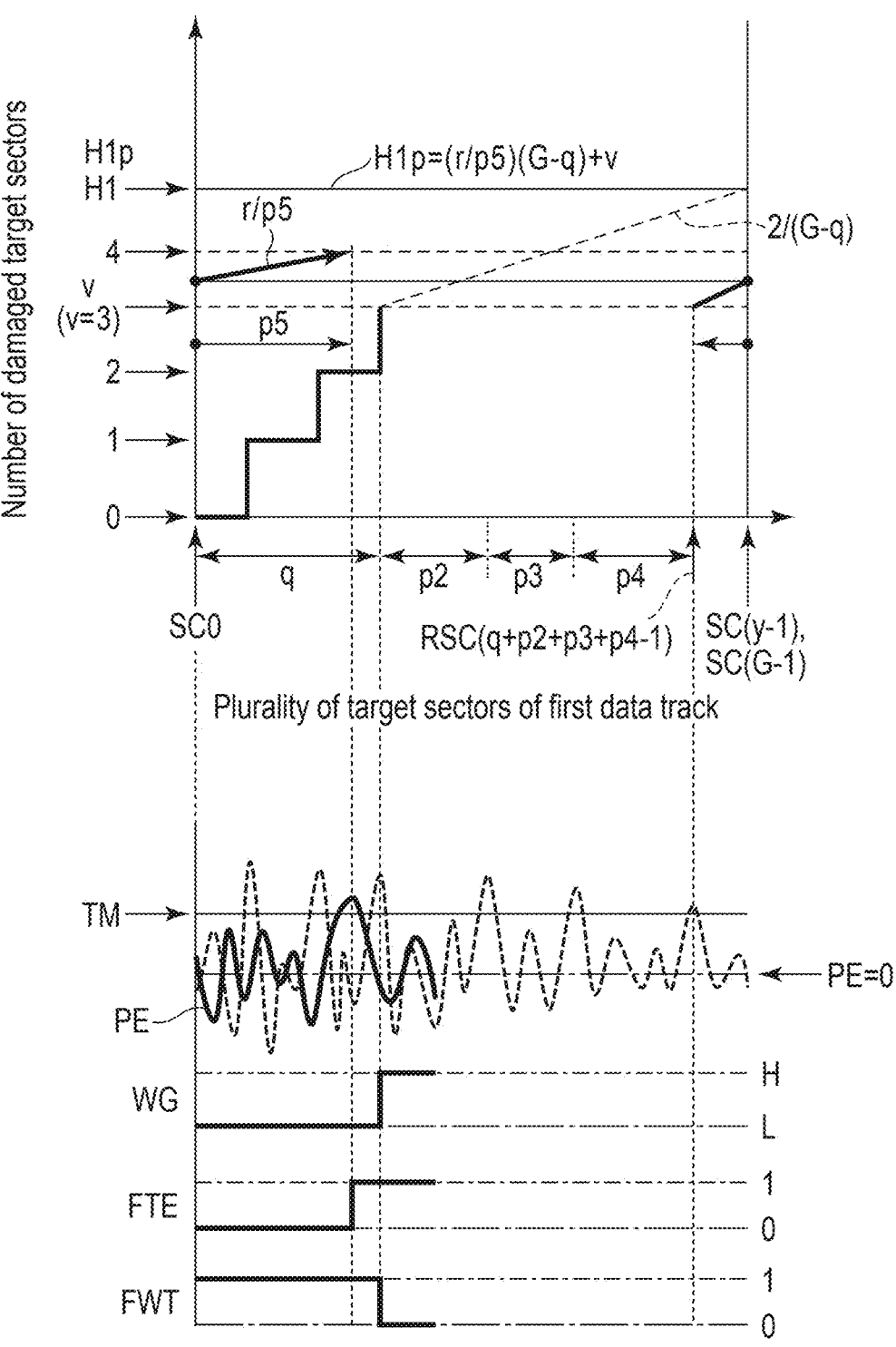
F I G. 18D

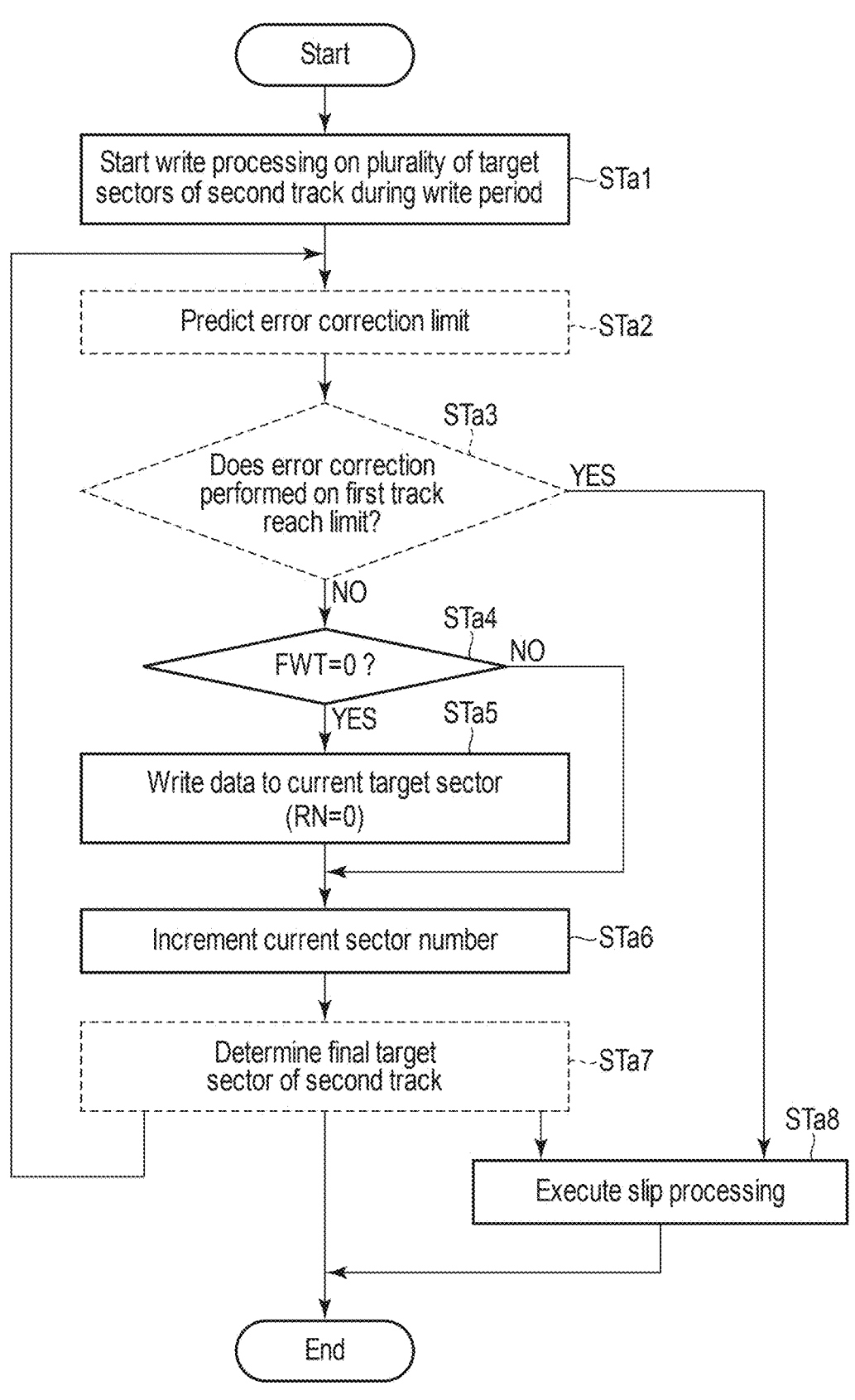
F I G. 19

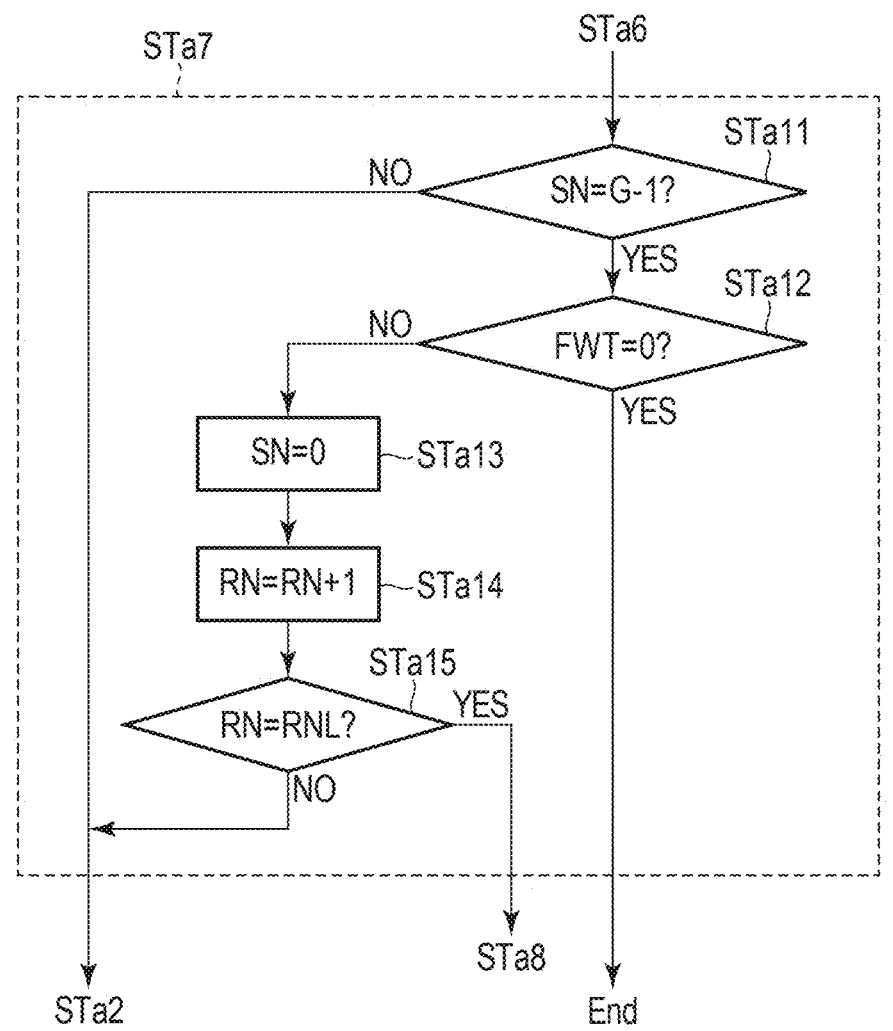
F I G. 20

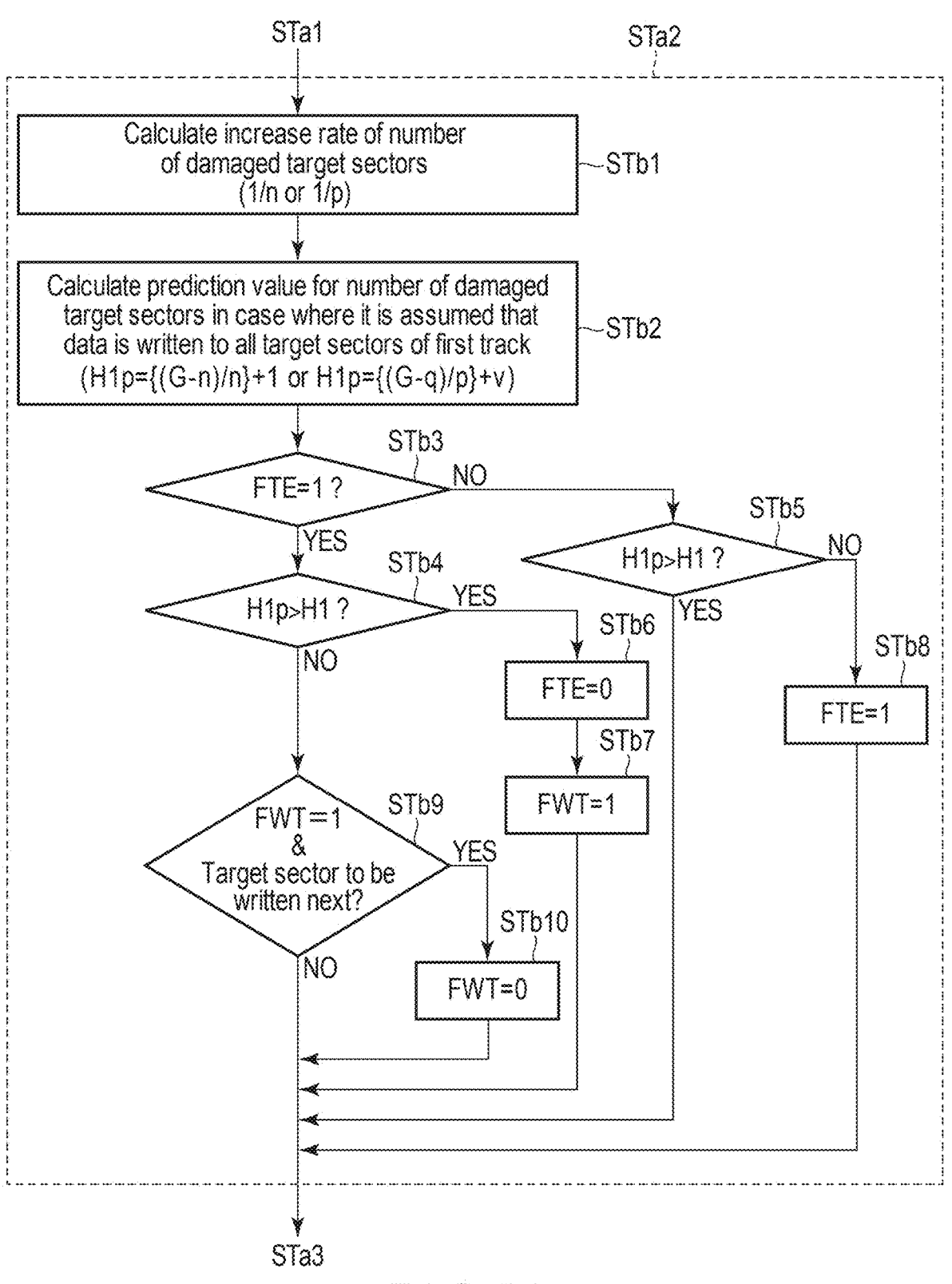
F I G. 21

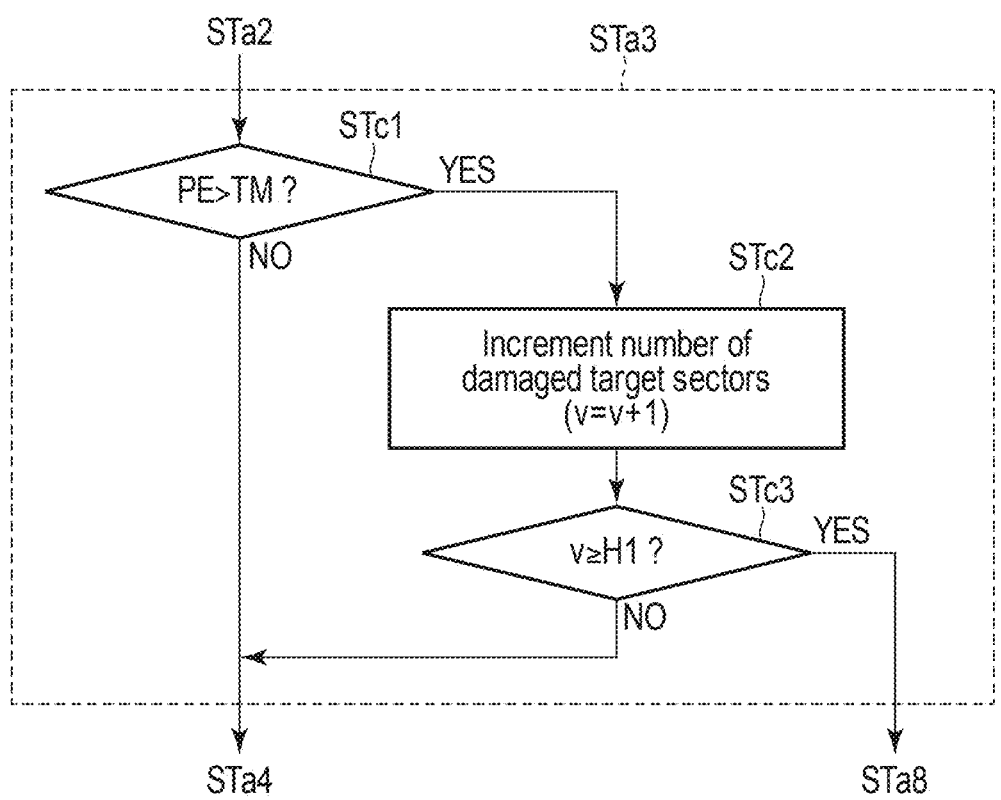
F I G. 22

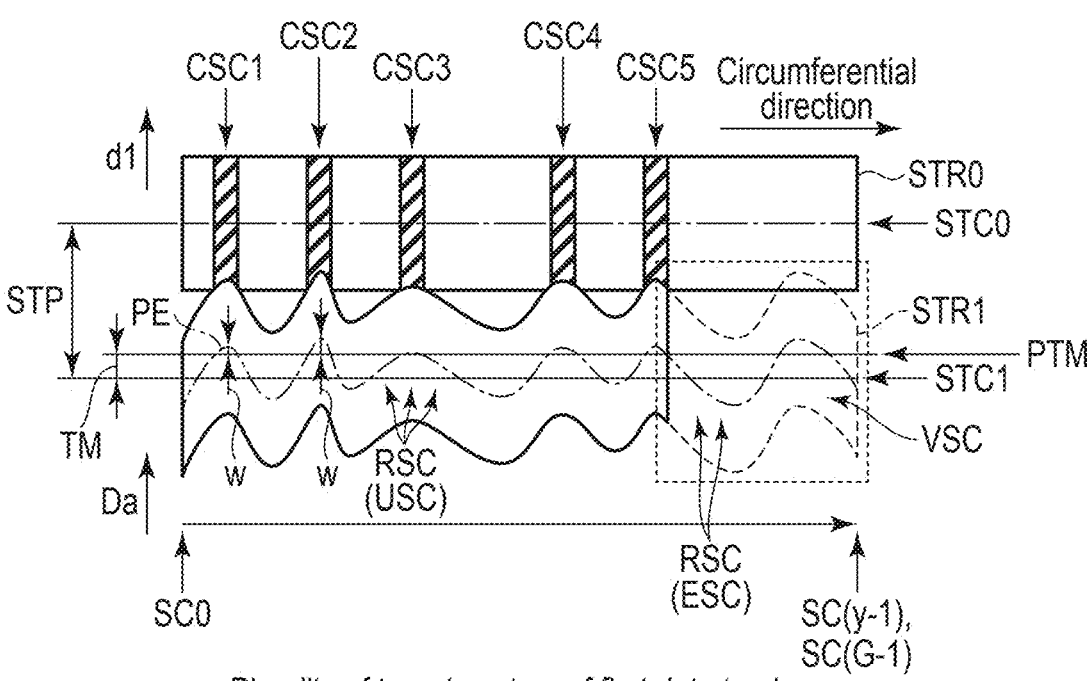
Plurality of target sectors of first data track
F I G. 23
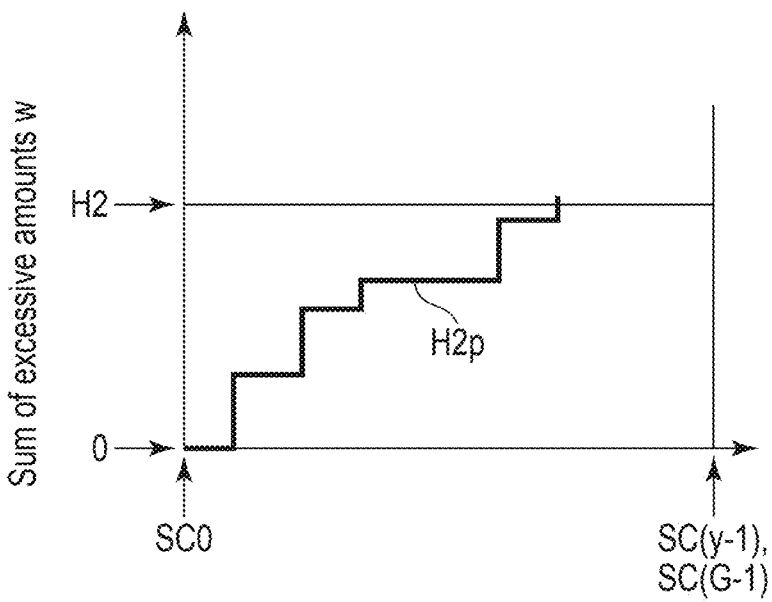
Plurality of target sectors of first data track
F I G. 24

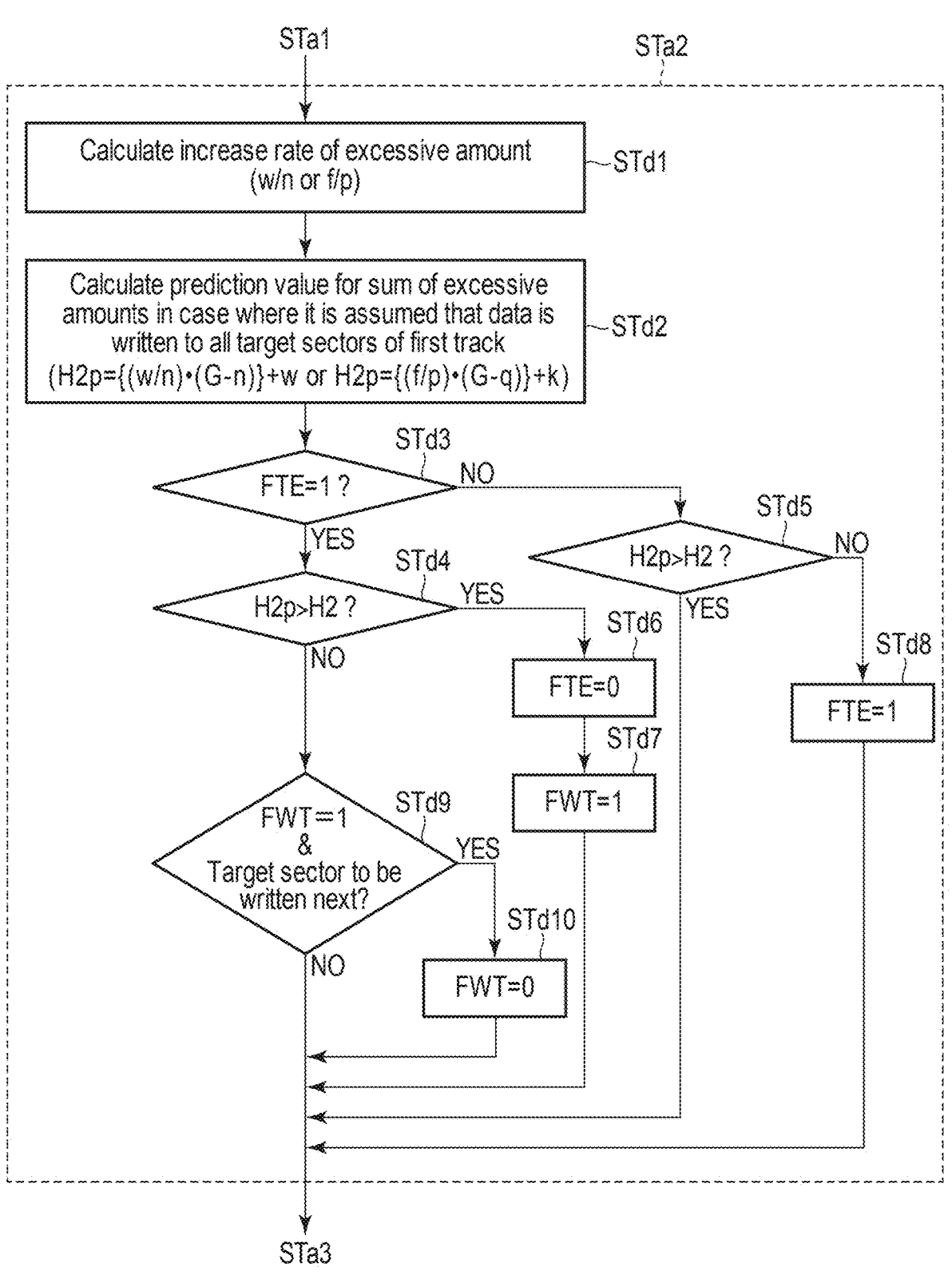
F I G. 25

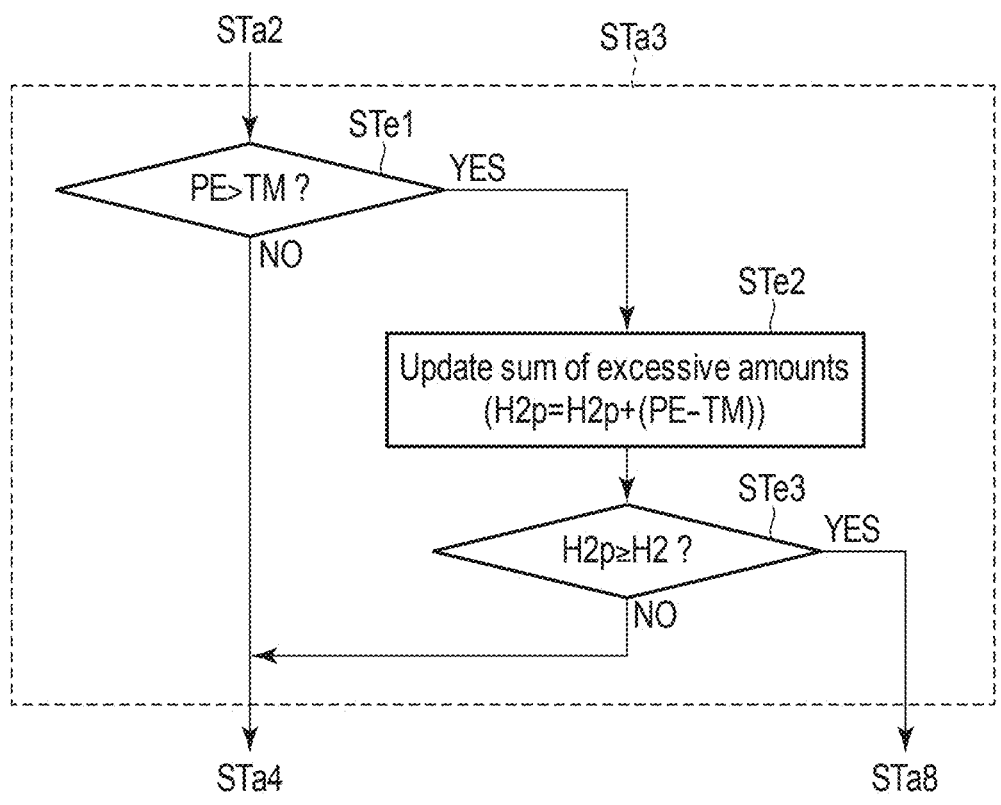
F I G. 26

MAGNETIC DISK DEVICE

CROSS-REFERENCE TO RELATED APPLICATIONS

This application is based upon and claims the benefit of priority from Japanese Patent Application No. 2024-062232, filed Apr. 8, 2024, the entire contents of which are incorporated herein by reference.

FIELD

Embodiments described herein relate generally to a magnetic disk device.

BACKGROUND

As a magnetic disk device, a conventional magnetic recording (CMR) (or a conventional recording) magnetic disk device that performs write on a plurality of tracks at intervals in a radial direction of a disk, a shingled recording (shingled magnetic recording (SMR), or shingled write recording (SWR)) magnetic disk device that performs overwrite on a plurality of tracks in a radial direction of a disk, and a hybrid recording magnetic disk device that selects the conventional magnetic recording mode and the shingled magnetic recording mode and executes the write are known.

BRIEF DESCRIPTION OF THE DRAWINGS

FIG. 1 is a block diagram illustrating a configuration of a magnetic disk device according to a first embodiment.

FIG. 2 is a perspective view illustrating a part of the magnetic disk device, and is a view illustrating a plurality of disks and a plurality of heads.

FIG. 3 is a schematic view illustrating an example of arrangement of a plurality of servo regions and a plurality of data regions of one disk according to the first embodiment.

FIG. 4 is a schematic diagram illustrating three tracks in a user data region in which shingled magnetic recording processing of the disk illustrated in FIG. 3 is performed and a write head.

FIG. 5 is a schematic diagram illustrating three tracks in a media cache in which conventional magnetic recording processing of the disk illustrated in FIG. 3 is performed and a write head.

FIG. 6 is a schematic diagram illustrating an example of data write processing in a disk.

FIG. 7 is a schematic diagram illustrating two bands and one guard band in the user data region illustrated in FIG. 6.

FIG. 8 is a schematic diagram illustrating three sectors of one track of the band illustrated in FIG. 6.

FIG. 9 is a schematic diagram illustrating two bands and one guard band, which are illustrated in FIG. 7, and is a diagram for describing a plurality of target sectors and a plurality of unused sectors.

FIG. 10 is a schematic diagram illustrating an example of a first track and a second track in a case where it is assumed that the magnetic disk device does not have a function of executing error correction on data on a track in track units, is a diagram for describing write processing on the first track and the second track, is a diagram for describing a state in which write processing on the second track is continued until error correction performed on the first track reaches a limit, and is a diagram illustrating a change in BER of the first track and a change in BER for a positioning error as graphs.

FIG. 11 is a schematic diagram illustrating an example of a first track and a second track in a case where it is assumed that the magnetic disk device does not have a function of executing error correction on data on a track in track units, is a diagram for describing write processing on the first track and the second track, is a diagram for describing a state in which write processing on the second track ends when a determination value is set for a write off-track slice smaller (more tight) than a track margin and it is determined that a positioning error is equal to or more than the write off-track slice, and is a diagram illustrating a change in BER of the first track and a change in BER for a positioning error as graphs.

FIG. 12 is a schematic diagram illustrating an example of a first track and a second track of the magnetic disk device having a function of executing error correction on data on a track in track units, is a diagram for describing write processing on the first track and the second track, is a diagram for describing a state in which write processing on the second track is continued until a determination value is set for a write off-track slice larger (looser) than a track margin and error correction performed on the first track reaches a limit, and is a diagram illustrating a change in BER of the first track and a change in BER for a positioning error as graphs.

FIG. 15 is a schematic diagram illustrating an example of a first track and a second track of the magnetic disk device, is a diagram for describing write processing on the first track and the second track, and is a diagram for describing a state in which write processing on the second track is continued until the number of damaged target sectors of the first track reaches three, prediction information regarding error correction is switched to abnormality information when the number thereof reaches three, the write processing on the second track is suspended, an error correction mode is switched to an invalid mode, and the disk enters a rotation standby state.

FIG. 16 is a graph illustrating a change in the number of damaged target sectors on the first track in FIG. 15, is a graph corresponding to a case where prediction information is abnormality information, and is a graph illustrating a timing chart regarding a positioning error, a write gate, a valid flag of an error correction mode, and a rotation standby flag during a period in which the write processing is executed on the second track.

FIG. 17 is a diagram for describing write processing subsequent to FIG. 15, and is a diagram for describing a state of shifting to write retry operation of resuming the write processing on the second track when the prediction information regarding the error correction is switched to normality information after the rotation standby operation of the disk.

FIG. 18B is a graph illustrating a change in the number of damaged target sectors on the first track, subsequent to FIG. 18A, is a graph corresponding to a case where an estimated increase rate of the damaged target sectors is 1/p3 and prediction information is abnormality information, and is a graph illustrating a timing chart regarding a positioning error, a write gate, a valid flag of an error correction mode, and a rotation standby flag during a period in which the write processing is executed on the second track.

FIG. 18C is a graph illustrating a change in the number of damaged target sectors on the first track, subsequent to FIG. 18B, is a graph corresponding to a case where an estimated increase rate of the damaged target sectors is 1/p4 and prediction information is abnormality information, and is a graph illustrating a timing chart regarding a positioning error, a write gate, a valid flag of an error correction mode, and a rotation standby flag during a period in which the write processing is executed on the second track.

FIG. 18D is a graph illustrating a change in the number of damaged target sectors on the first track, subsequent to FIG. 18C, is a graph corresponding to a case where an estimated increase rate of the damaged target sectors is r/p5 and prediction information is normality information, and is a graph illustrating a timing chart regarding a positioning error, a write gate, a valid flag of an error correction mode, and a rotation standby flag during a period in which the write processing is executed on the second track.

FIG. 19 is a flowchart illustrating a write processing method according to the first embodiment.

FIG. 20 is a flowchart for describing in detail a part of steps of the flowchart illustrated in FIG. 19.

FIG. 21 is a diagram for describing write processing according to the first embodiment, and is a flowchart for describing in detail another part of the steps of the flowchart illustrated in FIG. 19.

FIG. 22 is a diagram for describing write processing according to the first embodiment, and is a flowchart for describing in detail still another part of the steps of the flowchart illustrated in FIG. 19.

FIG. 23 is a schematic diagram illustrating an example of a first track and a second track of a magnetic disk device according to a second embodiment, is a diagram for describing write processing on the first track and the second track, and is a diagram for describing a state in which the write processing on the second track is continued until the sum of excessive amounts for a write head reaches a second threshold or more and the write processing on the second track ends when the sum thereof is the second threshold or more.

FIG. 24 is a graph illustrating a change in the sum of excessive amounts on the first track of FIG. 23.

FIG. 25 is a diagram for describing write processing according to the second embodiment, and is a flowchart for describing in detail still another part of the steps of the flowchart illustrated in FIG. 19.

FIG. 26 is a diagram for describing write processing according to the second embodiment, and is a flowchart for describing in detail still another part of the steps of the flowchart illustrated in FIG. 19.

DETAILED DESCRIPTION

Figure 13:
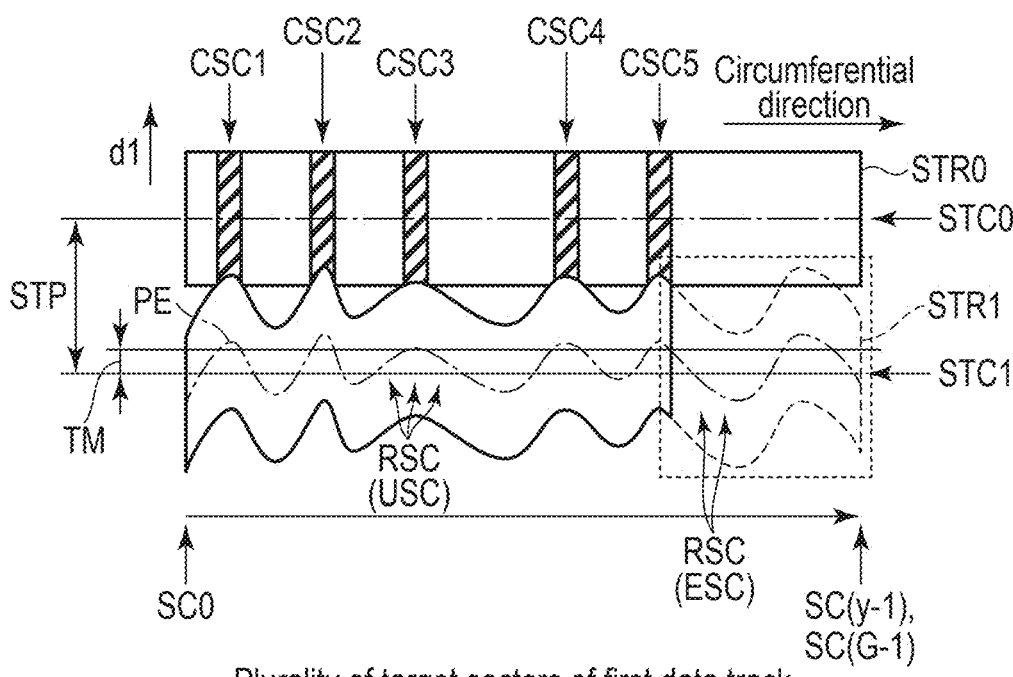
FIG. 13 is a schematic diagram illustrating an example of a first track and a second track of the magnetic disk device having a function of executing error correction on data on a track in track units, is a diagram for describing write processing on the first track and the second track, and is a diagram for describing a state in which write processing on the second track is continued until the number of damaged target sectors of the first track reaches five and the write processing on the second track ends when the number thereof reaches five.

In general, according to one embodiment, there is provided a magnetic disk device comprising:

a disk that has a first data track and a second data track adjacent to each other in a recording layer, the first data track and the second data track each including a plurality of target sectors to which data is to be written;

a write head that writes data to the recording layer of the disk;

a write processing unit that is capable of executing write processing of writing data to the recording layer;

an error correction unit that executes error correction on data of a damaged target sector in which data is determined to be damaged among the plurality of target sectors on the first data track;

a correction limit prediction unit; and a determination unit, during a write period in which the write processing is executed on the plurality of target sectors of the second data track after the write processing is executed on the plurality of target sectors of the first data track, the correction limit prediction unit being capable of determining whether or not data of each of the plurality of target sectors of the first data track is damaged, and generating prediction information that is information for predicting whether or not the error correction performed on the first data track reaches a limit until the write processing on all the target sectors of the second data track is completed, the determination unit determining whether or not to cause the write processing unit to continue the write processing on the second data track based on the prediction information.

First Embodiment

Hereinafter, a magnetic disk device 1 according to a first embodiment will be described with reference to the drawings. First, a configuration of the magnetic disk device 1 will be described. FIG. 1 is a block diagram illustrating the configuration of the magnetic disk device 1 according to the first embodiment. In the present embodiment, the magnetic disk device 1 is a hybrid recording magnetic disk device that selects a conventional magnetic recording mode and a shingled magnetic recording mode and executes write. However, the technology to be described later may be applied to a shingled magnetic recording magnetic disk device, or may be applied to a conventional magnetic recording magnetic disk device.

As illustrated in FIG. 1, the magnetic disk device 1 includes a plurality of, for example, one to ten disks (magnetic disks) DK as a recording medium, a spindle motor (SPM) 20 as a drive motor, a head stack assembly 22, a driver IC 120, a head amplifier integrated circuit (hereinafter, a head amplifier IC or a preamplifier) 130, a volatile memory 70, a buffer memory (buffer) 80, a nonvolatile memory 90, and a system controller 110 which is a one-chip integrated circuit. Furthermore, the magnetic disk device 1 is connected to a host system (hereinafter, simply referred to as a host) 100.

For example, each of the disks DK is formed to have a diameter of 97 mm (3.8 inches) and has recording layers (magnetic recording layers) on both surfaces thereof. In the first embodiment, the magnetic disk device 1 includes 1 to 11 disks DK, but the number of disks DK is not limited thereto.

The head stack assembly 22 can control a head HD mounted on an arm 30 to move to a target position on the disk DK by driving a voice coil motor (hereinafter referred to as VCM) 24, that is, can perform seek operation. The VCM 24 functions as an actuator.

In the disk DK, a user data region U available to a user and a system region S for writing information necessary for system management are allocated to a region where data can be written.

The head HD records and reads information on and from the disk DK. The head HD includes a write head WHD and a read head RHD, which are mounted on a slider as a main body. The write head WHD writes data to the recording layer of the disk DK. The read head RHD reads data from a data track of the recording layer of the disk DK.

A "center portion of the head HD" may be referred to as a "head HD", a "center portion of the write head WHD" may be referred to as a "write head WHD", and a "center portion of the read head RHD" may be referred to as a "read head RHD". The "center portion of the write head WHD" may be simply referred to as a "head HD", and the "center portion of the read head RHD" may be simply referred to as a "head HD".

The driver IC 120 controls driving of the SPM 20 and the VCM 24 according to control of the system controller 110 (specifically, an MPU 60 to be described later). The SPM 20 supports and rotates a plurality of the disks DK.

The head amplifier IC 130 includes a read amplifier and a write driver. The read amplifier amplifies a read signal read from the disk DK and outputs the amplified read signal to the system controller 110 (specifically, a read/write (R/W) channel 140 to be described later). The write driver outputs a write current corresponding to the signal output from the R/W channel 140 to the head HD.

The volatile memory 70 is a semiconductor memory in which stored data is lost when power supply is cut off. The volatile memory 70 stores data necessary for processing in each unit of the magnetic disk device 1. The volatile memory 70 is a random access memory (RAM). The volatile memory 70 is, for example, a dynamic random access memory (DRAM). However, the volatile memory 70 may be a synchronous dynamic random access memory (SDRAM).

The buffer memory 80 is a semiconductor memory that temporarily records data transmitted and received between the magnetic disk device 1 and the host 100. The buffer memory 80 may be configured integrally with the volatile memory 70. The buffer memory 80 is a volatile RAM. For example, the buffer memory 80 is a DRAM, a static random access memory (SRAM), an SDRAM, a ferroelectric random access memory (FeRAM), a magnetoresistive random access memory (MRAM), or the like.

The buffer memory 80 includes an area used as a read cache and a write cache, and temporarily stores a command or the like received from the host 100.

The nonvolatile memory 90 is a semiconductor memory that records stored data even when the power supply is cut off. The nonvolatile memory 90 is, for example, a NAND flash read only memory (FROM). However, the nonvolatile memory 90 may be a NOR flash ROM.

The system controller (controller) 110 is realized by using, for example, a large-scale integrated (LSI) circuit called a system-on-a-chip (SoC) in which a plurality of elements are integrated on a single chip. The system controller 110 includes the read/write (R/W) channel 140, a hard disk controller (HDC) 150, and a micro-processing unit (MPU) 60. The system controller 110 is electrically connected to the driver IC 120, the head amplifier IC 130, the volatile memory 70, buffer memory 80, the nonvolatile memory 90, and the host 100.

The R/W channel 140 executes signal processing on read data transferred from the disk DK to the host 100 and write data transferred from the host 100 in response to an instruction from the MPU 60 to be described later. The R/W channel 140 has a circuit or a function of modulating the write data. Furthermore, the R/W channel 140 has a circuit or a function of measuring a signal quality of the read data. The R/W channel 140 is electrically connected to, for example, the head amplifier IC 130, the HDC 150, the MPU 60, and the like.

The HDC 150 controls data transfer between the host 100 and the R/W channel 140 in response to an instruction from the MPU 60 to be described later. The HDC 150 is electrically connected to, for example, the R/W channel 140, the MPU 60, the volatile memory 70, the buffer memory 80, the nonvolatile memory 90, and the like.

The HDC 150 includes a gate generation unit 151. The gate generation unit 151 generates various gates, for example, a write gate, a read gate, a servo gate, and the like in response to a command from the host 100, an instruction from the MPU 60, and the like, and outputs these gates to the R/W channel 140, for example, a gate detection unit 141. Hereinafter, "activating a predetermined gate" may be referred to as "asserting a predetermined gate". Furthermore, "deactivating a predetermined gate" may be referred to as "negating a predetermined gate". The "asserting a predetermined gate" or the "negating a predetermined gate" may include the meaning of "generating a predetermined gate". The gate generation unit 151 may be included in the R/W channel 140 or the MPU 60.

The R/W channel 140 includes the gate detection unit 141. The gate detection unit 141 detects whether various gates, for example, the write gate, the read gate, the servo gate, and the like are asserted or negated.

For example, the gate detection unit 141 executes write processing in a case where the gate detection unit 141 detects that the write gate is asserted, and suspends (stops) the write processing in a case where the gate detection unit 141 detects that the write gate is negated.

In addition to this, the gate detection unit 141 executes read processing in a case where the gate detection unit 141 detects that the read gate is asserted, and stops the read processing in a case where the gate detection unit 141 detects that the read gate is negated. The gate detection unit 141 executes servo read processing in a case where the gate detection unit 141 detects that the servo gate is asserted, and stops the servo read processing in a case where the gate detection unit 141 detects that the servo gate is negated. The gate detection unit 141 may be inside the HDC 150 or MPU 60.

The MPU 60 is a control unit that controls each unit of the magnetic disk device 1 and is a main controller. The MPU 60 controls the VCM 24 via the driver IC 120 to execute servo control for positioning the head HD. The MPU 60 controls write-operation of data to the disk DK and selects a storage destination of write data transferred from the host 100. Furthermore, the MPU 60 controls read-operation of data from the disk DK, and controls processing of read data transferred from the disk DK to the host 100. The MPU 60 is connected to each unit of the magnetic disk device 1. The MPU 60 is electrically connected to, for example, the driver IC 120, the R/W channel 140, the HDC 150, and the like.

The MPU 60 includes a read/write processing unit 61, an error correction unit 64, a correction limit prediction unit 65, a determination unit 66, a switching unit 67, and a slip processing unit 68. The MPU 60 executes, on firmware, processing of each unit, for example, the read/write processing unit 61, the error correction unit 64, the correction limit prediction unit 65, the determination unit 66, the switching unit 67, the slip processing unit 68, and the like. The MPU 60 may include these units as a circuit.

The read/write processing unit 61 includes a write processing unit 62 and a read processing unit 63. In accordance with a command from the host 100, the write processing unit 62 controls data write processing, and the read processing unit 63 controls data read processing to cause the read head RHD to read the data from the disk DK. The write processing unit 62 can execute write processing of writing data to the recording layer of the disk DK. The read/write processing unit 61 controls the VCM 24 via the driver IC 120, positions the head HD at a target position (a predetermined radial position) on the disk DK, and executes read processing or write processing.

FIG. 2 is a perspective view illustrating a part of the magnetic disk device 1, and is a view illustrating a plurality of the disks DK and a plurality of heads HD.

As illustrated in FIG. 2, in a circumferential direction, a direction in which the disk DK is rotated is referred to as a rotation direction d3. In the example illustrated in FIG. 2, the rotation direction d3 is indicated in a counterclockwise direction, but may be indicated in an opposite direction (clockwise direction). Furthermore, a progressing direction d2 of the head HD with respect to the disk DK is opposite to the rotation direction d3. The progressing direction d2 is a direction in which the head HD sequentially writes and reads data with respect to the disk DK in the circumferential direction, that is, a direction in which the head HD progresses with respect to the disk DK in the circumferential direction.

The magnetic disk device 1 includes i disks of disks DK1 to DKi, and j heads of heads HD1 to HDj. In the present embodiment, the number of heads HD is twice the number of disks DK (j=2×i).

The disks DK1 to DKi are coaxially provided and overlapped at intervals. The diameters of the disks DK1 to DKi are the same. Here, terms such as "same", "identical", "coincide", and "equivalent" include not only exactly the same meaning but also the meaning of being different to the extent that it can be regarded as being substantially the same. The diameters of the disks DK1 to DKi may be different from each other.

Each disk DK has recording layers L on both sides. For example, the disk DK1 includes a first recording layer La1 and a second recording layer Lb1 on the opposite side of the first recording layer La1. The disk DK2 includes a first recording layer La2 and a second recording layer Lb2 on the opposite side of the first recording layer La2. The disk DKi includes a first recording layer Lai and a second recording layer Lbi on the opposite side of the first recording layer Lai. Each first recording layer La may be referred to as a front surface or a recording surface. Each second recording layer Lb may be referred to as a back surface or a recording surface.

However, each first recording layer La may be referred to as the back surface. In this case, each second recording layer Lb may be referred to as the front surface.

Each recording layer L has a user data region U and a system region S. The first recording layer La1 has a user data region Ua1 and a system region Sa1. The second recording layer Lb1 has a user data region Ub1 and a system region Sb1. The first recording layer La2 has a user data region Ua2 and a system region Sa2. The second recording layer Lb2 has a user data region Ub2 and a system region Sb2. The first recording layer Lai has a user data region Uai and a system region Sai. The second recording layer Lbi has a user data region Ubi and a system region Sbi.

In the user data region Ua1 (first recording layer La1), a track sandwiched between double dashed lines in the drawing is set as a track Ta1. In the user data region Ub1 (second recording layer Lb1), a track located on the opposite side of the track Ta1 is set as a track Tb1.

In the user data region Ua2 (first recording layer La2), a track sandwiched between double dashed lines in the drawing is set as a track Tc1. In the user data region Ub2 (second recording layer Lb2), a track located on the opposite side of the track Tc1 is set as a track Td1.

In the user data region Uai (first recording layer Lai), a track sandwiched between double dashed lines in the drawing is set as a track Te1. In the user data region Ubi (second recording layer Lbi), a track located on the opposite side of the track Te1 is set as a track Tf1.

In the present embodiment, the tracks Ta1, Tb1, Tc1, Td1, Te1, and Tf1 are located in the same cylinder.

The head HD faces the disk DK. In the present embodiment, one head HD faces each recording layer L of the disk DK. For example, the head HD1 faces the first recording layer La1 of the disk DK1, writes data in the first recording layer La1, and reads data from the first recording layer La1. The head HD2 faces the second recording layer Lb1 of the disk DK1, writes data in the second recording layer Lb1, and reads data from the second recording layer Lb1.

The head HD3 faces the first recording layer La2 of the disk DK2, writes data in the first recording layer La2, and reads data from the first recording layer La2. The head HD4 faces the second recording layer Lb2 of the disk DK2, writes data in the second recording layer Lb2, and reads data from the second recording layer Lb2. The head HDj−1 faces the first recording layer Lai of the disk DKi, writes data in the first recording layer Lai, and reads data from the first recording layer Lai. The head HDj faces the second recording layer Lbi of the disk DKi, writes data in the second recording layer Lbi, and reads data from the second recording layer Lbi.

FIG. 3 is a schematic view illustrating an example of arrangement of a plurality of servo regions SV and a plurality of data regions DTR of one disk DK according to the first embodiment. As illustrated in FIG. 3, in a radial direction d1 of the disk DK, a direction toward the outer circumference of the disk DK is referred to as an outward direction (outer side), and a direction opposite to the outward direction is referred to as an inward direction (inner side).

In FIG. 3, the user data region U is divided into an inner circumference region IR located in the inward direction, an outer circumference region OR located in the outward direction, and a middle circumference region MR located between the inner circumference region IR and the outer circumference region OR.

The disk DK has a plurality of the servo regions SV and a plurality of the data regions DTR. For example, a plurality of the servo regions SV may extend radially in the radial direction of the disk DK and be discretely disposed at predetermined intervals in the circumferential direction. For example, a plurality of the servo regions SV may extend linearly from the inner circumference to the outer circumference and be discretely disposed at predetermined intervals in the circumferential direction. For example, a plurality of the servo regions SV may extend spirally from the inner circumference to the outer circumference and be discretely disposed at predetermined intervals in the circumferential direction. Furthermore, for example, a plurality of the servo regions SV may be disposed like islands in the radial direction and discretely disposed by changing predetermined intervals in the circumferential direction.

Hereinafter, one servo region SV in a predetermined track may be referred to as a "servo sector". The "servo region SV" may also be referred to as a "servo sector SV". The servo sector includes servo data. Hereinafter, the "arrangement and the like of several pieces of servo data configuring a servo sector" may be referred to as a "servo pattern". The "servo data written in the servo sector" may also be referred to as a "servo sector".

Each of a plurality of the data regions DTR is disposed between a plurality of the servo regions SV. For example, the data region DTR corresponds to a region between two consecutive servo regions SV in the circumferential direction. Hereinafter, one data region DTR in a predetermined track may be referred to as a "data sector". The "data region DTR" may also be referred to as a "data sector DTR". The data sector includes user data. The "user data written to the data sector" may also be referred to as a "data sector". The "data sector" may also be referred to as "user data". Furthermore, a "pattern configured of several pieces of data" may be referred to as a "data pattern". In the example illustrated in FIG. 3, the data pattern of a predetermined track includes a plurality of pieces of servo data (servo sectors) and a plurality of pieces of user data (data sectors).

The servo region SV includes a plurality of zone servo regions ZSV. In addition to the zone servo regions ZSV, the servo region SV may include a region including a gap (shift of circumferential positions of two zone servo regions), a region including servo data, and a data region DTR. A plurality of the zone servo regions ZSV are discretely disposed along a radial direction d1. Each of a plurality of the zone servo regions ZSV extends in the radial direction d1.

One zone servo region (servo region) ZSV in a predetermined track may be referred to as a "zone servo sector" or a "servo sector". The "zone servo region (servo region) ZSV" may also be referred to as a "zone servo sector ZSV" or a "servo sector ZSV". The "servo data written to the zone servo sector" may also be referred to as a "zone servo sector" or a "servo sector". Hereinafter, the "arrangement and the like of several pieces of servo data configuring the zone servo sector" may be referred to as a "zone servo pattern" or a "servo pattern". Hereinafter, one servo region SV in a predetermined track may be referred to as a "zone pattern sector".

The "servo region SV" may also be referred to as a "zone pattern sector". "At least one piece of data or the like written to the zone pattern sector" may also be referred to as a "zone pattern sector". The zone pattern sector includes at least one zone servo sector. Hereinafter, the "data pattern of the zone pattern sector" may be referred to as a "zone data pattern".

In the example illustrated in FIG. 3, the servo region SV has zone servo regions ZSV0, ZSV1, and ZSV2. The zone servo regions ZSV0, ZSV1, and ZSV2 are disposed in a staggered manner in the radial direction. The zone servo regions ZSV0, ZSV1, and ZSV2 may be disposed stepwise in the radial direction.

The zone servo region ZSV2 is located on the inner circumference side in relation to the zone servo region ZSV1. The zone servo region ZSV0 is located on the outer circumference side in relation to the zone servo region ZSV1. For example, the zone servo region ZSV2 is disposed from the inner circumference region IR to the middle circumference region MR, the zone servo region ZSV1 is disposed from the inner circumference region IR to the outer circumference region OR, and the zone servo region ZSV0 is disposed from the middle circumference region MR to the outer circumference region OR. Hereinafter, in a predetermined servo region SV, a predetermined region in the radial direction in which a plurality of the zone servo regions ZSV are disposed in the circumferential direction may be referred to as a zone servo boundary region, a double servo region, or a double zone servo region ZB.

In the example illustrated in FIG. 3, a main servo region SVO and a sub-servo region SVE are alternately disposed at intervals in the circumferential direction. For example, one sub-servo region SVE is disposed between two main servo regions SVO disposed consecutively at intervals in the circumferential direction. In other words, one sub-servo region SVE is disposed between two main servo regions SVO disposed consecutively at intervals in the circumferential direction. For example, in a case where consecutive numbers are sequentially assigned to all the servo regions SV of the disk DK, the main servo region SVO corresponds to an odd-numbered servo region SV, and the sub-servo region SVE corresponds to an even-numbered servo region SV. Two or more sub-servo regions SVE may be disposed between two main servo regions SVO disposed consecutively at intervals in the circumferential direction.

The main servo region SVO and the sub-servo region SVE may include, for example, only a servo region (hereinafter, it may be referred to as a normal servo region) that reads and demodulates servo data as a whole. Hereinafter, "reading and demodulating servo data" may be referred to as "performing servo-read". The main servo region SVO and the sub-servo region SVE may include, for example, a normal servo region and a servo region (hereinafter, it may be referred to as a short servo region) in which servo-read is performed in a smaller circumferential range of the servo data than a circumferential range of the servo data in which the servo-read is performed in the normal servo region.

A media cache M is allocated to the disk DK. However, the media cache M may not be disposed on the disk DK.

By using a plurality of pieces of the servo data described above, for example, a positioning error of the head HD (for example, the write head WHD) can be derived.

In the description of the first embodiment, the case where the number of zones of the disk DK is three has been described as an example, but the number of zones of the disk DK can be variously changed. The number of zones of the disk DK may range from 30 to 40. Furthermore, each zone has a plurality of bands. For example, each zone has hundreds of bands.

FIG. 4 is a schematic diagram illustrating three tracks STR in the user data region U in which shingled magnetic recording processing of the disk DK illustrated in FIG. 3 is performed and a write head WHD. The user data region U is a shingled magnetic recording region. In the user data region U, sequential writing of data in units of bands is permitted, that is, shingled magnetic recording is permitted.

As illustrated in FIG. 4, the write head WHD can sequentially write data to the disk DK in the progressing direction d2. The read head RHD illustrated in FIG. 3 can also sequentially read data written to the disk DK in the progressing direction d2.

A direction in which a plurality of tracks STR, which are a plurality of data tracks, are continuously subjected to shingled magnetic recording in a direction parallel to the radial direction d1, that is, a direction in which a track STR to be written next overlaps a track STR written one ahead in the radial direction d1 is referred to as an overwriting direction or a record-progressing direction. In a band BAe illustrated in FIG. 4, an overwriting direction d5 is the inward direction, but the overwriting direction may be the outward direction.

For example, the overwriting direction applied to a plurality of bands BA (a plurality of zones Z) located on the outer circumference side in relation to a specific radial position and the overwriting direction applied to a plurality of the bands BA (a plurality of zones Z) located on the inner circumference side in relation to a specific radial position may be opposite to each other.

The band BAe includes a plurality of the tracks STR including tracks STRe, STRe+1, and STRe+2. The tracks STRe, STRe+1, and STRe+2 are continuously overwritten in the overwriting direction d5 in the order of these tracks. Among the tracks STRe, STRe+1, and STRe+2, the track STRe corresponds to a track to which data is written first, and the track STRe+2 corresponds to a track to which data is written last.

The track STRe includes a track center STCe at the center in the radial direction d1 in a case where another track is not overwritten. The track STRe+1 includes a track center STCe+1 at the center in the radial direction d1 in a case where another track is not overwritten. The track STRe+2 includes a track center STCe+2 at the center in the radial direction d1 in a case where another track is not overwritten.

In the example illustrated in FIG. 4, the tracks STRe, STRe+1, and STRe+2 are written at a pitch (shingled magnetic recording track pitch) STP. The track center STCe of the track STRe and the track center STCe+1 of the track STRe+1 are separated by the pitch STP in the radial direction d1. The track center STCe+1 of the track STRe+1 and the track center STCe+2 of the track STRe+2 are separated by the pitch STP in the radial direction d1. The tracks STRe to STRe+2 may be written at different pitches.

The width of a region in which the track STRe+1 is not overwritten on the track STRe in the radial direction d1 is the same as the width of a region in which the track STRe+2 is not overwritten on the track STRe+1 in the radial direction d1. The width of the region in which the track STRe+1 is not overwritten on the track STRe in the radial direction d1 may be different from the width of the region in which the track STRe+2 is not overwritten on the track STRe+1 in the radial direction d1.

In FIG. 4, for convenience of description, each track STR is illustrated in a rectangular shape, but is actually curved along the circumferential direction. Furthermore, each track STR may have a wave shape extending in the circumferential direction while varying in the radial direction d1. Although three tracks STR are overwritten in FIG. 4, two tracks STR may be overwritten or more than three tracks STR may be overwritten.

The write processing unit 62 can select a shingled magnetic recording mode in which data is written to a plurality of the tracks STR in an overlapping manner in the overwriting direction d5 and cause the write head WHD to write data to each band BA. In the example illustrated in FIG. 4, the write processing unit 62 sequentially performs shingled magnetic recording on the tracks STRe to STRe+2 at the pitch STP in the inward direction (overwriting direction d5) in the band BAe. Since the user data region U is a region in which data is written in the shingled magnetic recording mode, the recording density of the user data region U can be improved.

The write processing unit 62 writes the track STRe+1 at the pitch STP in the inward direction of the track STRe and overwrites the track STRe+1 on a part of the inner circumference side of the track STRe. The write processing unit 62 writes the track STRe+2 at the pitch STP in the inward direction of the track STRe+1 and overwrites the track STRe+2 on a part of the inner circumference side of the track STRe+1.

FIG. 5 is a schematic diagram illustrating three tracks CTR and the write head WHD in the media cache M in which conventional magnetic recording processing of the disk DK illustrated in FIG. 3 is performed. The media cache M and the system region S illustrated in FIG. 3 are the conventional magnetic recording region. In the media cache M and the system region S, random writing of data is permitted, that is, conventional magnetic recording is permitted.

As illustrated in FIG. 5, the media cache M includes a plurality of the tracks CTR including tracks CTRe, CTRe+1, and CTRe+2. Each of a plurality of the tracks CTR is a data track. For example, widths (track widths) of the tracks CTRe, CTRe+1, and CTRe+2 in the radial direction d1 are the same. The track widths of the tracks CTRe to CTRe+2 may be different from each other.

The track CTRe includes a track center CTCe at the center in the radial direction d1, the track CTRe+1 includes a track center CTCe+1 at the center in the radial direction d1, and the track CTRe+2 includes a track center CTCe+2 at the center in the radial direction d1. In the example illustrated in FIG. 5, the tracks CTRe, CTRe+1, and CTRe+2 are written at a pitch (conventional magnetic recording track pitch) CTP. The track center CTCe of the track CTRe and the track center CTCe+1 of the track CTRe+1 are separated by the pitch CTP. The track center CTCe+1 of the track CTRe+1 and the track center CTCe+2 of the track CTRe+2 are separated by the pitch CTP.

The track CTRe and the track CTRe+1 are separated by a gap GP. The track CTRe+1 and the track CTRe+2 are separated by the gap GP. The tracks CTRe to CTRe+2 may be written at different pitches. In FIG. 5, for convenience of description, each track CTR is illustrated in a rectangular shape, but is actually curved along the circumferential direction. Furthermore, each track CTR may have a wave shape extending in the circumferential direction while varying in the radial direction d1.

The write processing unit 62 can select a conventional magnetic recording mode in which data is written to a plurality of the tracks CTR at intervals in the radial direction d1 of the disk DK and execute the write processing. In the example illustrated in FIG. 5, the write processing unit 62 positions the write head WHD at the track center CTCe in a predetermined region of the disk DK and performs conventional magnetic recording on the track CTRe or a predetermined sector of the track CTRe.

The write processing unit 62 positions the write head WHD at the track center CTCe+1 spaced apart from the track center CTCe of the track CTRe in the inward direction by the pitch CTP, and performs conventional magnetic recording on the track CTRe+1 or a predetermined sector of the track CTRe+1. The write processing unit 62 positions the write head WHD at the track center CTCe+2 spaced apart from the track center CTCe+1 of the track CTRe+1 in the inward direction by the pitch CTP, and performs conventional magnetic recording on the track CTRe+2 or a prede-termined sector of the track CTRe+2.

The write processing unit 62 may perform conventional magnetic recording on the tracks CTRe, CTRe+1, and CTRe+2 sequentially in a predetermined region of the disk DK, and may randomly performs conventional magnetic recording on a predetermined sector of the track CTRe, a predetermined sector of the track CTRe+1, and a predeter-mined sector of the track CTRe+2.

FIG. 6 is a schematic diagram illustrating an example of data write processing in the disk DK. Each of the track STR and the track CTR is a data track. As illustrated in FIG. 6, the user data region U includes bands BAa, BAb, and BAc. The bands BAa, BAb, and BAc belong to the same zone Ze. In the zone Ze, the bands BAa, BAb, and BAc are inter-mittently disposed in the overwriting direction in the order of these bands. The bands BAa and BAb are adjacent to each other in the radial direction d1, and the bands BAb and BAc are adjacent to each other in the radial direction d1.

The band BAa includes x tracks of tracks STRa0, STRa1, STRa2, . . . , STRa(x-3), STRa(x-2), and STRa(x-1). The tracks STRa0 to STRa(x-1) are subjected to shingled mag-netic recording in the overwriting direction d5 in the order of these tracks. In the band BAa, the track STRa0 corre-sponds to a head track to which data is written first, and the track STRa(x-1) corresponds to a tail track to which data is written last.

The band BAb includes x tracks of tracks STRb0, STRb1, STRb2, . . . , STRb(x-3), STRb(x-2), and STRb(x-1). The tracks STRb0 to STRb(x-1) are subjected to shingled mag-netic recording in the overwriting direction d5 in the order of these tracks. In the band BAb, the track STRb0 corre-sponds to a head track to which data is written first, and the track STRb(x-1) corresponds to a tail track to which data is written last.

The band BAc includes x tracks of tracks STRc0, STRc1, STRc2, . . . , STRc(x-3), STRc(x-2), and STRc(x-1). The tracks STRc0 to STRc(x-1) are subjected to shingled mag-netic recording in the overwriting direction d5 in the order of these tracks. In the band BAc, the track STRc0 corre-sponds to a head track to which data is written first, and the track STRc(x-1) corresponds to a tail track to which data is written last.

The number of tracks STR included in each band BA belonging to the same zone Z is the same. For example, the number of tracks STR included in each band BA belonging to the zone Ze is the same. In other words, the number of tracks STR included in the band BA is fixed for each zone Z. In this example, the number of tracks STR included in each band BA belonging to the zone Ze is x.

FIG. 6 illustrates tracks CTR(x-2) and CTR(x-1). In FIG. 6, the tracks CTR(x-2) and CTR(x-1) are subjected to conventional magnetic recording in the media cache M or the system region S. The tracks CTR(x-2) and CTR(x-1) are adjacent to each other in the radial direction d1.

FIG. 7 is a schematic diagram illustrating two bands BAa and BAb and one guard band GB in the user data region U illustrated in FIG. 6. As illustrated in FIG. 7, unlike the conventional magnetic recording method, in the shingled magnetic recording method, the MPU 60 manages the track group of the user data region U in units called bands based on a part of the track STR being overlapped.

The guard band GB is generally provided between the bands BA adjacent in the radial direction d1. The guard band GB includes a guard track GTR. Unlike the first embodi-ment, the guard band GB may include a plurality of the guard tracks GTR. The guard band GB has a role of suppressing interference between the adjacent bands BA. The guard band GB makes it possible to perform shingled magnetic recording in units of one band BA. Furthermore, with the guard band GB, a range (band BA) in which write is sequentially performed can be separated.

For example, the track center STCa(x-3) of the track STRa(x-3), the track center STCa(x-2) of the track STRa (x-2), the track center STCa(x-1) of the track STRa(x-1), the track center GTC of the guard track GTR, the track center STCb0 of the track STRb0, the track center STCb1 of the track STRb1, and the track center STCb2 of the track STRb2 are located at equal pitches in the overwriting direction d5.

Except for the guard band GB, the recording capacity of each band BA of the user data region U is usually deter-mined in advance based on a required specification from the user. The MPU 60 can record data having the same capacity in each band BA. In general, the recording capacity of each band BA is 128 MiB or 256 MiB.

FIG. 8 is a schematic diagram illustrating three sectors SCe, SC (e+1), and SC (e+2) of one track STRa0 of the band BAa illustrated in FIG. 6. As illustrated in FIG. 8, Each track STR includes a plurality of sectors SC. The track STRa1 includes a plurality of sectors SC including sectors SCe, SC (e+1), and SC (e+2). The number of sectors SC included in each track STR belonging to the same zone Z is the same. In the first embodiment, the number of sectors SC included in each track STR belonging to the zone Ze is y.

Each sector SC has a length Ls in the circumferential direction of the disk DK. Each sector SC may be a split sector divided by the servo sector SV. In this case, the length of the sector SC may not be Ls.

The write head WHD is an energy assisted recording magnetic head that performs energy assisted magnetic recording (EAMR). In the first embodiment, the write head WHD is configured to use energy other than magnetism, but the present invention is not limited thereto, and the write head WHD may be a magnetic head not configured to perform energy assisted magnetic recording.

FIG. 9 is a schematic diagram illustrating two bands BAa and BAb and one guard band GB, which are illustrated in FIG. 7, and is a diagram for describing a plurality of target sectors RSC and a plurality of unused sectors VSC.

In FIG. 9, for convenience of description, each track STR is illustrated in a rectangular shape, but is actually curved along the circumferential direction. Furthermore, although a plurality of the tracks STR are arranged in the overwriting direction d5 without being overlapped, actually, a plurality of the tracks STR are arranged in the overwriting direction d5 while being overlapped. Furthermore, in the drawing, a dot pattern is attached to each of the target sectors RSC. Each of the unused sectors VSC is not patterned.

As illustrated in FIG. 9, the band number of the band BAa is "a", and the band number of the band BAb is "b". The track numbers of each band BA are set to "0" to "x–1". The sector numbers of each track STR are set to "0" to "y–1". Hereinafter, the sector SC of each band BA may be identified using a sign "SC (track number, sector number)".

In the first embodiment, the band BAa is a band adjacent to the band BAb, and is a band located above the band BAb in the overwriting direction d5.

Each track STR of the band BAa includes G target sectors RSC (one or more target sectors RSC) in which valid data is written. For example, the track STRa0 includes y target sectors RSC (G=y). All the sectors SC of the track STRa0 are the target sectors RSC. The track STRa(x-1) includes five target sectors RSC (G=5). The remaining sectors SC of the track STRa(x-1) are unused sectors VSC in which valid data is not written.

As described above, the number of target sectors RSC of the track STRa0 is different from the number of target sectors RSC of the track STRa(x-1).

In each band BA of the zone Ze, all sectors SC of x–1 tracks STR numbered 0 to x–2 are target sectors RSC in which valid data is written and are recording sectors USC. In the track STR numbered x–1 of each band BA of the zone Ze, the five sectors SC numbered 0 to 4 are the target sectors RSC and the recording sectors USC. On the other hand, in the track STR numbered x–1, the remaining sectors SC numbered 5 to y–1 are unused sectors VSC in which valid data is not written.

FIG. 10 is a schematic diagram illustrating an example of a first track STR0 and a second track STR1 in a case where it is assumed that the magnetic disk device 1 does not have a function of executing error correction on data on a track TR, is a diagram for describing write processing on the first track STR0 and the second track STR1, is a diagram for describing a state in which write processing on the second track STR1 is continued until the error correction performed on the first track STR0 reaches a limit, and is a diagram illustrating a change in bit error rate (BER) of the first track STR0 and a change in BER for a positioning error (PE) as graphs. In the description using FIG. 10, it is assumed that the magnetic disk device 1 does not include the error correction unit 64 of FIG. 1. Furthermore, also in FIG. 10, for convenience of description, the first track STR0 and the like are drawn assuming that the circumferential direction is linear.

As illustrated in FIG. 10, the first track STR0 and the second track STR1 are data tracks, and all sectors SC of the first track STR0 and all sectors (data sectors) SC of the second track STR1 are target sectors RSC. The write processing on the first track STR0 is ideally executed without the positioning error PE (PE≈0 or PE=0).

When the magnetic disk device 1 is affected by external vibration or the like at the time of write processing, the positioning error PE occurs when positioning the write head WHD. The positioning error PE is a deviation amount of the write head WHD from the target position in the radial direction d1. By setting a track margin TM, it is possible to determine the allowable range in which data on the adjacent track is guaranteed to be readable.

For example, in a case where the write processing is executed on the second track STR1 and a target sector RSCe, a target sector RSC (e+1), and a target sector RSC (e+2) of the first track STR0 are adjacent to the write head WHD in the radial direction d1 during a period in which the positioning error PE exceeds the track margin TM, it is determined that data in the target sectors RSCe, RSC (e+1), and RSC (e+2) on the first track STR0 are damaged. Although it is desirable that the BER of the data is lower, the BER of the data in the target sectors RSCe, RSC (e+1), and RSC (e+2) of the first track STR0 exceed a threshold BERTH. As can be seen from the graph on the right side of FIG. 10, as the positioning error PE increases, an adverse effect of adjacent track interference (ATI) increases, and the BER of the data on the first track STR0 excessively affected by the ATI becomes excessively high.

Therefore, the target sector RSCe, the target sector RSC (e+1), and the target sector RSC (e+2) among a plurality of the target sectors RSC of the first track STR0 are determined to be a damaged target sector CSC1, a damaged target sector CSC2, and a damaged target sector CSC3. The quality of the signal obtained by reading the data in the damaged target sectors CSC1 to CSC3 deteriorate, or the data in the damaged target sectors CSC1 to CSC3 are erased.

In the example described with reference to FIG. 10, the magnetic disk device 1 does not have a function of executing error correction on the data on the tracks TR in track units. Here, the error correction in track units is also referred to as error correction in track units, track error checking and correcting (track ECC), or the like. Therefore, the target sector RSCe, the target sector RSC (e+1), and the target sector RSC (e+2) remain as the damaged target sector CSC1, the damaged target sector CSC2, and the damaged target sector CSC3.

Here, in FIG. 10, it has been described that all the target sectors RSC of the track TR have the common track margin TM. Also in the description of FIGS. 11, 12, 13, 15, 17, and 23 to be described later, it is assumed that all the target sectors RSC of the track TR have a common track margin TM. However, the setting of the track margin TM is an example, and the track margin TM may be varied in units of the target sectors RSC.

FIG. 11 is a schematic diagram illustrating an example of the first track STR0 and the second track STR1 in a case where it is assumed that the magnetic disk device 1 does not have a function of executing error correction on data on the track TR in track units, is a diagram for describing write processing on the first track STR0 and the second track STR1, is a diagram for describing a state in which write processing on the second track STR1 is suspended when a determination value is set for a write off-track slice WOS smaller (more tight) than the track margin TM and it is determined that the positioning error PE is equal to or more than the write off-track slice WOS, and is a diagram illustrating a change in BER of the first track STR0 and a change in BER for the positioning error PE as graphs. Also in FIG. 11, for convenience of description, the first track STR0 and the like are drawn assuming that the circumferential direction is linear. In the description using FIG. 11, it is assumed that the magnetic disk device 1 does not include the error correction unit 64 of FIG. 1.

As illustrated in FIG. 11, the first track STR0 and the second track STR1 are data tracks, and all sectors SC of the first track STR0 and all sectors (data sectors) SC of the second track STR1 are target sectors RSC. The write processing on the first track STR0 is ideally executed without the positioning error PE (PE≈0 or PE=0).

In order to prevent or suppress write processing in a state in which the positioning error PE exceeds the track margin TM, the magnetic disk device 1 has the write off-track slice WOS. When it is determined that the positioning error PE exceeds the write off-track slice WOS during the period in which data is written to the second track STR1, writing of data to the second track STR1 can be suspended. Among a plurality of the target sectors RSC of the second track STR1, the remaining target sectors RSC to which data is not written are empty sectors ESC in which data is not written. The occurrence of the damaged target sector CSC in the first track STR0 can be prevented by avoiding the situation in which the positioning error PE exceeds the track margin TM.

The track STR includes a servo sector in addition to the sector SC which is a data sector. In the track STR, generally, the data sectors and the servo sectors are alternately disposed. The write head WHD can derive the positioning error PE together with the servo sector. Therefore, generally, the positioning error PE is information obtained intermittently.

In order not to satisfy PE>TM, it is necessary to set the write off-track slice WOS so as to satisfy WOS≤TM. In order to prevent PE>TM from being satisfied, it is desirable to set the write off-track slice WOS so as to satisfy WOS<TM. Thus, the write processing on the second track STR1 can be suspended before the positioning error PE exceeds the track margin TM, and a situation in which the quality of the data on the first track STR0 deteriorates can be avoided.

However, it should be noted that as the write off-track slice WOS is set smaller, the write processing is more likely to be suspended, which leads to deterioration of the write performance of the magnetic disk device 1. In the magnetic disk device 1 not having the function of executing error correction in track units, in a case where the write processing on the second track STR1 is suspended, the write retry processing of maintaining the rotation standby state of the disk DK until PE≤WOS and then resuming the write processing on the second track STR1 is executed. Since each of the empty sectors ESC of the second track STR1 can be changed to the recording sector USC in the write retry processing, a situation in which the utilization efficiency of the second track STR1 remains low is avoided.

Here, in FIG. 11, it has been described that all the target sectors RSC of the track TR have the common write off-track slice WOS. Also in the description of FIG. 12 to be described later, it is described that all the target sectors RSC of the track TR have the common write off-track slice WOS. However, the setting of the write off-track slice WOS is an example, and the write off-track slices WOS may be different for each target sector RSC.

FIG. 12 is a schematic diagram illustrating an example of a first track STR0 and a second track STR1 of the magnetic disk device 1 having a function of executing error correction on data on a track TR in track units, is a diagram for describing write processing on the first track STR0 and the second track STR1, is a diagram for describing a state in which write processing on the second track STR1 is continued until a determination value is set for the write off-track slice WOS larger (looser) than the track margin TM and error correction performed on the first track STR0 reaches a limit, and is a diagram illustrating a change in BER of the first track STR0 and a change in BER for the positioning error PE as graphs. Also in FIG. 12, for convenience of description, the first track STR0 and the like are drawn assuming that the circumferential direction is linear.

As illustrated in FIG. 12, the write processing on the first track STR0 is ideally executed without the positioning error PE (PE≈0 or PE=0).

The magnetic disk device 1 includes the error correction unit 64. In a case where the damaged target sector CSC occurs in the track ST, the read processing unit 63 can detect that the damaged target sector CSC occurs in the track ST together with the head amplifier IC 130, and the error correction unit 64 can execute error correction processing of recovering data in the damage target sector CSC. For example, in a case where the damaged target sector CSC occurs in the first track STR0, the error correction unit 64 recovers the data in the damaged target sector CSC based on the data in a plurality of the target sectors RSC on the first track STR0 and the data in a parity sector.

The parity sector is generated based on the data in a plurality of the target sectors RSC on the first track STR0, and can be provided in a part of a plurality of the target sectors RSC on the first track STR0. However, the parity sector may be provided on the track TR other than the first track STR0. Alternatively, the parity sector may be provided in a memory (for example, the nonvolatile memory 90) other than the disk.

As described above, even when the damaged target sector CSC occurs in the first track STR0, the error correction unit 64 can execute error correction processing of recovering data in the damaged target sector CSC. Therefore, it is possible to allow the damaged target sector CSC to occur on the first track STR0. In the magnetic disk device 1 including the error correction unit 64, the write off-track slice WOS can be set so as to satisfy WOS≥TM, the write processing is unlikely to end, and deterioration of the write performance of the magnetic disk device 1 can be suppressed.

Note that the number of damaged target sectors on which the error correction unit 64 can execute error correction in track units has an upper limit in units of tracks TR. For example, in a case where the number of damaged target sectors CSC of the first track STR0 exceeds the upper limit (for example, five), the error correction unit 64 can recover the data in five damaged target sectors CSC, but it is difficult to recover the data in the sixth and subsequent damaged target sectors CSC.

Figure 14:
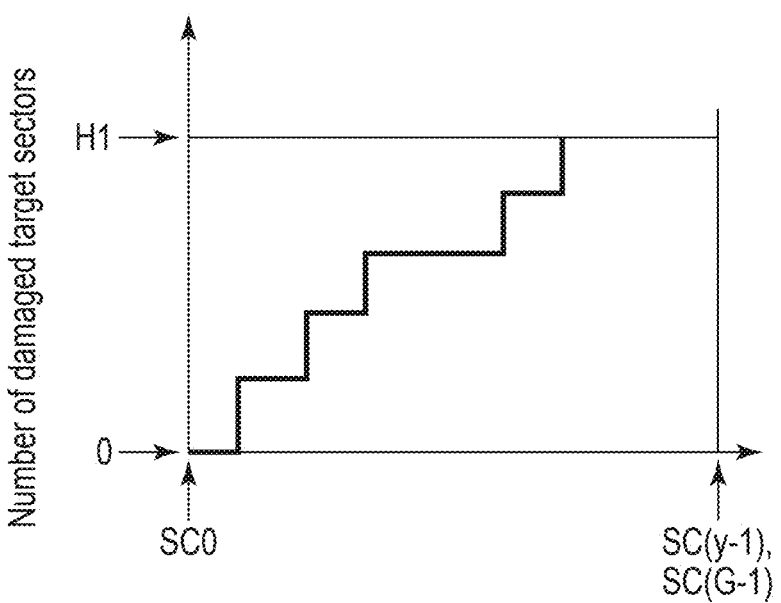
FIG. 14 is a graph illustrating a change in the number of damaged target sectors on the first track of FIG. 13.

FIG. 13 is a schematic diagram illustrating an example of a first track STR0 and a second track STR1 of the magnetic disk device 1 having a function of executing error correction on data on a track TR in track units, is a diagram for describing write processing on the first track STR0 and the second track STR1, and is a diagram for describing a state in which write processing on the second track STR1 is continued until the number of damaged target sectors CSC of the first track STR0 reaches five and the write processing on the second track STR1 ends when the number thereof reaches five. Also in FIG. 13, for convenience of description, the first track STR0 and the like are drawn assuming that the circumferential direction is linear. FIG. 14 is a graph illustrating a change in the number of damaged target sectors CSC on the first track STR0 of FIG. 13.

As illustrated in FIGS. 13 and 14, the write processing on the first track STR0 is ideally executed without the positioning error PE (PE≈0 or PE=0).

As described above, the number of damaged target sectors on which the error correction unit 64 can execute error correction in track units is limited. When the frequency of satisfying PE>TM is high, there is a concern that the number of damaged target sectors CSC of adjacent tracks TR increases, and error correction cannot be performed on all the damaged target sectors CSC.

In response to this problem, there is disclosed a technology of determining that the correction limit for a track ECC has been reached based on the number of data sectors determined to be interfered by the adjacent track and the degree of interference based on the relationship between the positioning error PE and the track margin TM at the time of the write processing (JP 2023-119547 A). According to the disclosed technology, when it is determined that the correction limit of the track ECC has been reached, the write-operation is stopped, and the remaining data is slipped to the adjacent track or another region (paragraphs to of the specification, FIG. 11 of the drawings, and the like).

A first threshold H1 is the upper limit of the number of damaged target sectors CSC on which the error correction unit 64 can execute error correction in track units, in each track TR. Here, an example is illustrated in which the first threshold H1 is set to five sectors (H1=5). At the time of the write processing on the second track STR1, the magnetic disk device 1 vibrates, and thus the number of damaged target sectors CSC that occur in the first track STR0 increases.

Before the write processing on all the target sectors RSC (target sectors RSC for one round) of the second track STR1 is completed, for example, when the write processing is executed on about ⅔ of the target sectors RSC of the second track STR1, the damaged target sectors CSC1, CSC2, CSC3, CSC4, and CSC5 occur on the first track STR0, and the number of damaged target sectors CSC1 to CSC5 reaches the first threshold H1.

Therefore, when the write processing on the second track STR1 is continued, there is a concern that the damaged target sector CSC on which error correction cannot be executed may occur on the first track STR0. Therefore, the write processing on the second track STR1 is not continued, and the remaining data scheduled to be written to the second track STR1 is slipped to another region (a track other than the second track STR1) and written (recorded).

As described above, when the magnetic disk device 1 vibrates, the frequency of executing slip processing of writing the remaining data to other regions becomes high before the write processing on all the target sectors RSC of the track TR ends. In a case where the slip processing of writing the remaining data to a specific data region such as the media cache M of the disk DK is executed, the seek operation frequently occurs, and thus, the write performance significantly deteriorates.

Therefore, in the first embodiment, it is possible to provide the magnetic disk device 1 capable of predicting whether or not the error correction performed on the track TR of the disk DK in track units reaches the limit. For example, occurrence of the slip processing can be suppressed. Furthermore, in the first embodiment, it is possible to provide the magnetic disk device 1 capable of enhancing the utilization efficiency of the track TR.

Next, a write processing method according to the first embodiment will be described in detail.

As illustrated in FIGS. 1 and 15, the write processing unit 62 can select a shingled magnetic recording mode in which the data of the second track STR1 is superimposed and written on the data of the first track STR0 in the overwriting direction d5 parallel to the radial direction d1 of the disk DK.

The error correction unit 64 can execute error correction of the data of the damaged target sector CSC in which the data is determined to be damaged among a plurality of the target sectors RSC of each of the first track STR0 and the second track STR1. Here, attention is paid to a write period during which the write processing is executed on a plurality of the target sectors RSC of the first track STR0 and then the write processing is executed on a plurality of the target sectors RSC of the second track STR1.

During this write period, the correction limit prediction unit 65 can determine whether or not the data of the target sector RSC of the first tracks STR0 is damaged (whether or not the positioning error PE exceeds the track margin TM). Then, the correction limit prediction unit 65 can generate prediction information that is information for predicting whether or not the error correction performed on the first track STR0 reaches the limit until the write processing on all the target sectors RSC of the second track STR1 is completed.

During the write period, the determination unit 66 can determine whether or not to cause the write processing unit 62 to continue the write processing on the second track STR1 based on the prediction information. Thus, before the number of damaged target sectors CSC of the first track STR0 reaches the limit (for example, the first threshold H1), the determination unit 66 can determine whether to continue the write processing on the second track STR1, suspend the write processing, or execute the slip processing. Since there is an option for continuing the write processing, it is possible to suppress a decrease in the write performance of the magnetic disk device 1. Since there is an option for suspending the write processing, it is possible to cause the disk DK to enter the rotation standby state without executing the slip processing, which can suppress a significant decrease in write performance. Since there is an option for executing the slip processing, it is possible to avoid a situation in which the number of damaged target sectors CSC of the first track STR0 exceeds the limit.

Here, in a direction parallel to the radial direction d1 of the disk DK, the first track STR0 is located in a first direction Da as viewed from the second track STR1. In the first direction Da, a position away from a position where the positioning error PE is 0 by the track margin TM is set as a reference radial position PTM. During the write period, when the position of the write head WHD protrudes in the first direction Da from the reference radial position PTM, the correction limit prediction unit 65 can determine the target sector RSC adjacent to the write head WHD in the radial direction d1 among a plurality of the target sectors RSC of the first track STR0 as the damaged target sector CSC.

The switching unit 67 can set a valid mode that enables the error correction mode performed by the error correction unit 64 in track units. During the write period, in a case where the prediction information is normality information for predicting that the error correction in track units does not reach the limit, the switching unit 67 can set the error correction mode to the valid mode, and the determination unit 66 can cause the write processing unit 62 to continue the write processing on the second track STR1. For example, in a case where the magnetic disk device 1 does not vibrate, the determination unit 66 can determine to cause the write processing unit 62 to continue the write processing.

The switching unit 67 can switch the error correction mode performed in track units to the valid mode or the invalid mode that disables the error correction mode. During the write period, in a case where the prediction information is switched to abnormality information for predicting that the error correction reaches the limit, the switching unit 67 can switch the error correction mode to the invalid mode, and the determination unit 66 can cause the write processing unit 62 to suspend the write processing on the second track STR1.

During the write period, when the error correction mode is switched to the invalid mode, the write processing unit 62 can shift to the write retry operation in which the write processing on the second track STR1 is suspended, the VCM 24 is driven to maintain the position of the write head WHD in the radial direction d1 of the disk DK, and the write processing is resumed after the rotation standby of the disk DK. For example, in a case where the magnetic disk device 1 vibrates, the write processing can be suspended until the vibration stops. As the slip processing involving the seek operation becomes unnecessary, the deterioration of the write performance can be suppressed.

After the write processing unit 62 shifts to the write retry operation, in a case where the prediction information is switched to normality information, the switching unit 67 can switch the error correction mode to the valid mode, and the determination unit 66 can cause the write processing unit 62 to resume the write processing on the second track STR1. When the switching unit 67 returns the error correction mode to the valid mode, it is possible to resume the write processing on the remaining empty sectors ESC in which data is not written among a plurality of the target sectors RSC of the second track STR1. Therefore, the empty sector ESC can be used as the recording sector USC in which the valid data is written. As the number of empty sectors ESC can be reduced, the utilization efficiency of the second track STR1 can be enhanced.

The correction limit prediction unit 65 may determine whether or not the prediction information is the normality information or the abnormality information at an early stage when it is determined that the damaged target sector CSC first occurs in the first track STR0.

During the write period, the correction limit prediction unit 65 can manage the number of one or more damaged target sectors CSC in which the data is determined to be damaged among a plurality of the target sectors RSC of the first track STR0. When the number of the one or more damaged target sectors CSC reaches a first threshold H1, the correction limit prediction unit 65 predicts that the error correction performed on the first track STR0 has reached the limit. The first threshold H1 is the upper limit value of the number of one or more damaged target sectors CSC on which the error correction unit 64 can execute error correction in the first track STR0.

Here, the number of all target sectors RSC of the second track STR1 is set to G, the first threshold H1 is set to H1, and, during the write period, the number of target sectors RSC to which data is written until it is determined that the damaged target sector CSC first occurs in the second track STR1 after data is first written to the second track STR1 is set to n.

Formulas 1 and 2 are as follows.

$$H1 \geq \{(G-n)/n\} + 1 \qquad \text{(Formula 1)}$$

$$H1 < \{(G-n)/n\} + 1 \qquad \text{(Formula 2)}$$

During the write period, when the correction limit prediction unit 65 determines that the damaged target sector CSC does not occur in the first track STR0, the switching unit 67 can maintain the error correction mode in the valid mode.

On the other hand, during the write period, when the correction limit prediction unit 65 first determines that the damaged target sector CSC occurs in the first track STR0, the switching unit 67 performs processing in the error correction mode as follows. That is, in a case where the correction limit prediction unit 65 generates normality information corresponding to Formula 1, the switching unit 67 can maintain the error correction mode in the valid mode. On the other hand, in a case where the correction limit prediction unit 65 generates abnormality information corresponding to Formula 2, the switching unit 67 can switch the error correction mode to the invalid mode.

As described above, the correction limit prediction unit 65 can determine at an early stage whether or not the prediction information is the normality information or the abnormality information. However, since one is very small for the number of damaged target sectors CSC (1<<H1), the determination regarding the prediction information at the time when it is determined that the damaged target sector CSC first occurs in the first track STR0 may not be performed, and the write processing may be continued.

The correction limit prediction unit 65 can determine whether the prediction information is the normality information or the abnormality information when a plurality of the damaged target sectors CSC occurs in the first track STR0. The correction limit prediction unit 65 may start the above-described determination after two damaged target sectors CSC occur in the first track STR0, or may start the above-described determination after three damaged target sectors CSC occur in the first track STR0.

Here, during the write period, the number of target sectors RSC to which data is written until it is determined that the damaged target sector CSC finally occurs in the first track STR0 after it is previously determined that the damaged target sector CSC occurs in the first track STR0 is set to p. The number of target sectors RSC to which data is written until it is determined that the damaged target sector CSC finally occurs in the first track STR0 after data is first written to the second track STR1 is set to q. The number of damaged target sectors CSC in which data is damaged is set to v, the number of damaged target sector CSC being obtained until it is determined that the damaged target sector CSC finally occurs in the first track STR0.

Formulas 3 and 4 are as follows.

$$H1 \geq \{(G-q)/p\} + v \qquad \text{(Formula 3)}$$

$$H1 < \{(G-q)/p\} + v \qquad \text{(Formula 4)}$$

During the write period, when the correction limit prediction unit 65 determines that the damaged target sector CSC does not occur in the first track STR0, the switching unit 67 can maintain the error correction mode in the valid mode.

On the other hand, during the write period, when the correction limit prediction unit 65 determines that the damaged target sector CSC occurs in the first track STR0 for the second time or later, the switching unit 67 performs processing in the error correction mode as follows. That is, in a case where the correction limit prediction unit 65 generates normality information corresponding to Formula 3, the switching unit 67 can maintain the error correction mode in the valid mode. On the other hand, in a case where the correction limit prediction unit 65 generates abnormality information corresponding to Formula 4, the switching unit 67 can switch the error correction mode to the invalid mode.

The slip processing unit 68 can execute slip processing.

When the determination unit 66 determines that the error correction performed on the first track STR0 reaches the limit before the data are written to all the target sectors RSC of the second track STR1, the write processing unit 62 ends the write processing on the second track STR1, and a plurality of the target sectors RSC of the second track STR1 are classified into a plurality of target sectors RSC (a plurality of recording sectors USC) on which the write processing is executed and which belong to a first group and one or more target sectors RSC (empty sectors ESC) on which the write processing is not executed and which belong to a second group.

Moreover, the slip processing unit 68 can execute slip processing of driving the VCM 24 to cause the position of the write head WHD in the radial direction d1 of the disk DK to face a third data track TR of the disk DK and writing data corresponding to one or more target sectors RSC (empty sectors ESC) belonging to the second group to a third data track.

The slip processing unit 68 can also execute the slip processing of writing data to a memory outside the disk DK.

When the determination unit 66 determines that the error correction performed on the first track STR0 reaches the limit before the data are written to all the target sectors RSC of the second track STR1, the write processing unit 62 ends the write processing on the second track STR1, and a plurality of the target sectors RSC of the second track STR1 are classified into a plurality of target sectors RSC (a plurality of recording sectors USC) which belong to the first group and one or more target sectors RSC (empty sectors ESC) which belong to the second group.

Moreover, the slip processing unit 68 can execute slip processing of writing data corresponding to one or more target sectors RSC (empty sectors ESC) belonging to the second group to a memory (for example, the nonvolatile memory 90).

Next, a specific example of the write processing method described above will be described.

FIG. 15 is a schematic diagram illustrating an example of a first track STR0 and a second track STR1 of the magnetic disk device 1, is a diagram for describing write processing on the first track STR0 and the second track STR1, and is a diagram for describing a state in which write processing on the second track STR1 is continued until the number of damaged target sectors CSC of the first track STR0 reaches three, prediction information regarding error correction is switched to abnormality information when the number thereof reaches three, the write processing on the second track STR1 is suspended, an error correction mode is switched to an invalid mode, and the disk DK enters a rotation standby state. Also in FIG. 15, for convenience of description, the first track STR0 and the like are drawn assuming that the circumferential direction is linear. FIG. 16 is a graph illustrating a change in the number of damaged target sectors CSC on the first track STR0 in FIG. 15, is a graph corresponding to a case where prediction information is abnormality information, and is a graph illustrating a timing chart regarding a positioning error PE, a write gate WG, a valid flag FTE of an error correction mode, and a rotation standby flag FWT during a period in which the write processing is executed on the second track STR1.

As illustrated in FIGS. 15 and 16, the write processing on the first track STR0 is ideally executed without the positioning error PE (PE≈0 or PE=0).

When the write processing on the second track STR1 is started, the gate detection unit 141 detects that the write gate WG is asserted (in this case, a H level). The valid flag FTE of the error correction mode is initialized to 1, and the rotation standby flag FWT is initialized to 0.

In a case where the magnetic disk device 1 vibrates, when the write processing on the second track STR1 is executed, the damaged target sector CSC may occur in the first track STR0. Two or more target sectors RSC continuous in the circumferential direction (progressing direction d2) may be determined to be the damaged target sectors CSC.

When three damaged target sectors CSC occur in the first track STR0, it is predicted from the increase rate of the damaged target sectors CSC that the number of damaged target sectors CSC that may occur in the entire first track STR0 exceeds the first threshold H1 (five). In this case, when three damaged target sectors CSC occur in the first track STR0, the write processing on the second track STR1 is suspended to shift to the write retry operation, and the error correction mode in track units is switched to the invalid mode.

The gate detection unit 141 detects that the write gate WG is negated (in this case, a L level). The valid flag FTE of the error correction mode is switched to 0, and the rotation standby flag FWT is switched to 1.

Here, attention is paid to the increase rate (1/p) of the damaged target sector CSC when the third damaged target sector CSC occurs in the first track STR0. In a case where the write processing on the second track STR1 is not suspended, the number H1$p$ of final damaged target sectors CSC predicted to occur in the first track STR0 is represented by Equation below.

$$H1p = \{(G - q)/p\} + v$$

Since H1$p$>H1 is satisfied, in a case where the write processing is not suspended, it is determined that the error correction performed on the first track STR0 reaches the limit before parity data is written to the last sector (parity sector) of the second track STR1, and it is predicted that the processing proceeds to the slip processing.

It is presumed that the reason why the error correction performed on each track reaches the limit earlier than expected is that the head HD swings due to external vibration of the magnetic disk device 1 or the like. Therefore, before the slip processing is executed, the write processing on the second track STR1 is stopped, and the rotation standby processing of the disk DK is performed. Therefore, it is possible to wait until the external vibration of the magnetic disk device 1 is stopped.

FIG. 17 is a diagram for describing the write processing subsequent to FIG. 15, and is a diagram for describing a state of shifting to write retry operation of resuming the write processing on the second track STR1 when the prediction information regarding the error correction for each track is switched to normality information after the rotation standby operation of the disk DK. Also in FIG. 17, for convenience of description, the first track STR0 and the like are drawn assuming that the circumferential direction is linear.

Figure 18A:
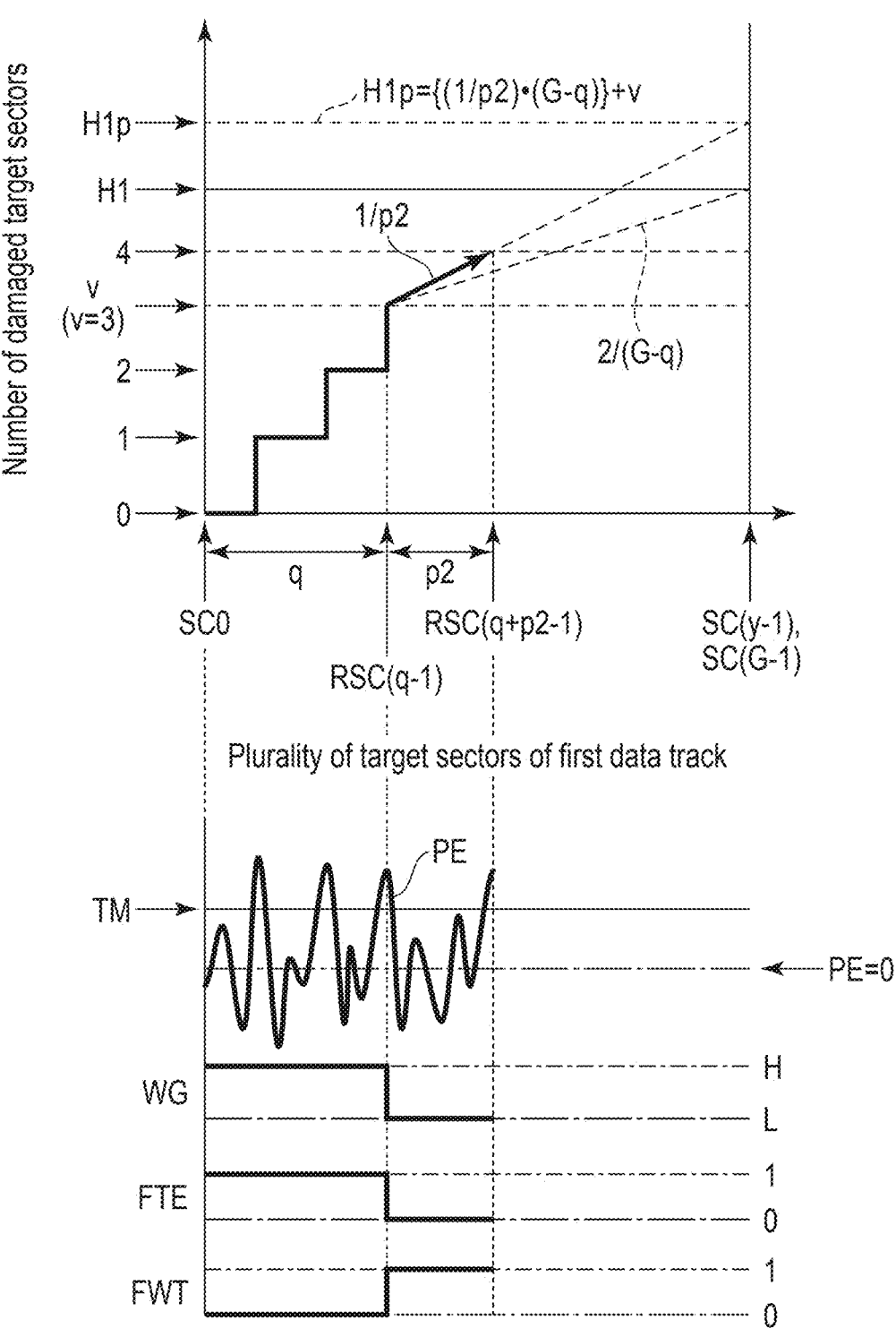
FIG. 18A is a graph illustrating a change in the number of damaged target sectors on the first track in FIG. 17, is a graph corresponding to a case where an estimated increase rate of the damaged target sectors is 1/p2 and prediction information is abnormality information, and is a graph illustrating a timing chart regarding a positioning error, a write gate, a valid flag of an error correction mode, and a rotation standby flag during a period in which the write processing is executed on the second track.

FIG. 18A is a graph illustrating a change in the number of damaged target sectors CSC on the first track STR0 in FIG. 17, is a graph corresponding to a case where the estimated increase rate of the damaged target sectors CSC is 1/p2 and prediction information is abnormality information, and is a graph illustrating a timing chart regarding a positioning error PE, a write gate WG, a valid flag FTE of an error correction mode, and a rotation standby flag FWT during a period in which the write processing is executed on the second track STR1.

FIG. 18B is a graph illustrating a change in the number of damaged target sectors CSC on the first track STR0, subsequent to FIG. 18A, is a graph corresponding to a case where the estimated increase rate of the damaged target sectors CSC is 1/p3 and prediction information is abnormality information, and is a graph illustrating a timing chart regarding a positioning error PE, a write gate WG, a valid flag FTE of an error correction mode, and a rotation standby flag FWT during a period in which the write processing is executed on the second track STR1.

FIG. 18C is a graph illustrating a change in the number of damaged target sectors CSC on the first track STR0, subsequent to FIG. 18B, is a graph corresponding to a case where the estimated increase rate of the damaged target sectors CSC is 1/p4 and prediction information is abnormality information, and is a graph illustrating a timing chart regarding a positioning error PE, a write gate WG, a valid flag FTE of an error correction mode, and a rotation standby flag FWT during a period in which the write processing is executed on the second track STR1.

FIG. 18D is a graph illustrating a change in the number of damaged target sectors CSC on the first track STR0, subsequent to FIG. 18C, is a graph corresponding to a case where the estimated increase rate of the damaged target sectors CSC is r/p5 and prediction information is normality information, and is a graph illustrating a timing chart regarding a positioning error PE, a write gate WG, a valid flag FTE of an error correction mode, and a rotation standby flag FWT during a period in which the write processing is executed on the second track STR1. In FIG. 18D, the positioning error PE of the first cycle is indicated by a dashed line, and the positioning error PE of the second cycle is indicated by a solid line. Furthermore, the write gate WG, the valid flag FTE in the error correction mode, and the rotation standby flag FWT in the second cycle are indicated by solid lines.

As illustrated in FIGS. 17 and 18A, while maintaining the position of the write head WHD in the radial direction d1 in a state in which the write processing on the second track STR1 is suspended and performing the rotation standby processing of the disk DK, the correction limit prediction unit 65 calculates the estimated increase rate of the damaged target sectors CSC. This is because the switching unit 67 determines whether or not the error correction mode in track units can be switched from the invalid mode to the valid mode. When the processing proceeds to the rotation standby processing, the write processing unit 62 suspends the write processing on the second track STR1 after a target sector RSCq.

PE>TM is satisfied at a timing when the write head WHD faces a target sector RSC (q+p2−1) of the second track STR1, and PE>TM is satisfied for the first time after the rotation standby processing is started. Since the estimated increase rate of the damaged target sectors CSC is 1/p2 and is larger than 2/(G−q), H1p>H1 is satisfied, and the correction limit prediction unit 65 generates abnormality information. The switching unit 67 holds the error correction mode in track units in the invalid mode and continues the rotation standby processing.

The write gate WG remains negated, the valid flag FTE of the error correction mode remains 0, and the rotation standby flag FWT remains 1.

As illustrated in FIGS. 17 and 18B, subsequently, PE>TM is satisfied at a timing when the write head WHD faces a target sector RSC (q+p2+p3−1) of the second track STR1, and PE>TM is satisfied for the second time after the rotation standby processing is started. Since the estimated increase rate of the damaged target sectors CSC is 1/p3 and is larger than 2/(G−q), H1p>H1 is satisfied, and the correction limit prediction unit 65 generates abnormality information. The switching unit 67 holds the error correction mode in track units in the invalid mode and continues the rotation standby processing.

The write gate WG remains negated, the valid flag FTE of the error correction mode remains 0, and the rotation standby flag FWT remains 1.

As illustrated in FIGS. 17 and 18C, subsequently, PE>TM is satisfied at a timing when the write head WHD faces a target sector RSC (q+p2+p3+p4−1) of the second track STR1, and PE>TM is satisfied for the third time after the rotation standby processing is started. Since the estimated increase rate of the damaged target sectors CSC is 1/p4 and is larger than 2/(G−q), H1p>H1 is satisfied, and the correction limit prediction unit 65 generates abnormality information. The switching unit 67 holds the error correction mode in track units in the invalid mode and continues the rotation standby processing.

The write gate WG remains negated, the valid flag FTE of the error correction mode remains 0, and the rotation standby flag FWT remains 1.

As illustrated in FIGS. 17 and 18D, subsequently, PE>TM is satisfied at a timing when the write head WHD faces a target sector RSC (q+p2+p3+p4+p5−1) of the second track STR1, and PE>TM is satisfied for the fourth time after the rotation standby processing is started. The number of p5 is equal to or larger than {(G−q)/2}. The estimated increase rate of the damaged target sectors CSC is r/p5. In the example of FIG. 18D, the numerical value of r is 1.

When the numerical value of r is 1 or less, in other words, when the number of times satisfying PE>TM during the period in which the write head WHD faces p5 target sectors RSC is 1 or less, H1p≤H1 is satisfied, and the correction limit prediction unit 65 can generate the normality information.

As described above, the correction limit prediction unit 65 calculates the increase rate immediately after the error correction mode in track units is switched to the invalid mode, and thus it is possible to determine at an early stage whether or not the error correction mode in track units can be returned to the valid mode.

On the other hand, in a case where the correction limit prediction unit 65 determines that the magnetic disk device 1 vibrates, the calculation of the increase rate may be skipped for a predetermined period (for example, a period until the write head WHD faces the target sector RSC0). For example, in a case where the number of times satisfying PE>TM occurs two times or more and H1p>(α×H1) is satisfied during a period of the write processing on the second track STR1, the correction limit prediction unit 65 can determine that the magnetic disk device 1 vibrates. By skipping the calculation of the increase rate, the calculation amount of the correction limit prediction unit 65 can be suppressed. α is, for example, 2. However, the numerical value of α is only required to be a numerical value exceeding 1.0, and is not limited to 2.

In the example of FIG. 18D, r=1, and H1p=4. Since the estimated increase rate r/p5 of the damaged target sectors CSC is equal to or less than 2/(G−q), the correction limit prediction unit 65 generates normality information. The switching unit 67 can return the error correction mode in track units to the valid mode.

Immediately after satisfying H1p≤H1, the valid flag FTE of the error correction mode is switched to 1. Thereafter, at the timing when the write head WHD faces the target sector RSCq of the second track STR1, the gate detection unit 141 detects that the write gate WG is asserted, and the rotation standby flag FWT is switched to 0. As described above, the write processing on the second track STR1 can be resumed from the target sector RSCq.

As illustrated in FIG. 17 and FIGS. 18A to 18D, the position of the write head WHD in the radial direction d1 is maintained in a state in which the write processing on the second track STR1 is suspended and the rotation standby processing of the disk DK, corresponding to 1 rotation, is performed, and the write retry operation of resuming the write processing from the target sector RSCq on which the write processing is suspended last time is performed.

Since the rotation standby period of the disk DK is provided during a period in which data is written to the second track STR1, the magnetic disk device 1 does not vibrate. As a result of this, the estimated increase rate of the damaged target sectors CSC is reduced, and H1p≤H1 is satisfied. In a case where H1p≤H1 is not satisfied even when the rotation standby processing corresponding to 1 rotation is performed, the rotation standby processing corresponding to 2 rotations is only required to be performed or the rotation standby processing corresponding to 3 rotations is only required to be performed until H1p≤H1 is satisfied.

Next, the write processing method according to the first embodiment will be described with reference to the flowchart. FIG. 19 is a flowchart illustrating the write processing method according to the first embodiment. FIG. 20 is a flowchart for describing in detail a part of steps of the flowchart illustrated in FIG. 19.

As illustrated in FIG. 19, when the write processing on the second track STR1 is started, the rotation standby flag FWT is initialized to 0, the valid flag FTE of the error correction mode is initialized to 1, the number SN of write-completed target sectors of the second track STR1 is initialized to 0, the number v of damaged target sectors is initialized to 0, and the rotation standby counter RN is initialized to 0.

FWT=0
FTE=1
SN=0
V=0
RN=0

First, in step STa1, during the write period, the write processing unit 62 starts the write processing on a plurality of the target sectors RSC of the second track STR1. Subsequently, in step STa2, the correction limit prediction unit 65 predicts the error correction limit and proceeds to step STa3. In step STa3, the determination unit 66 determines whether or not the error correction performed on the first track STR0 reaches the limit.

When the error correction performed on the first track STR0 does not reach the limit (NO in step STa3), the processing proceeds to step STa4, and the determination unit 66 performs the rotation standby determination using the rotation standby flag FWT. When a state is not the rotation standby state (YES in step STa4), the processing proceeds to step STa5, the write processing unit 62 executes the write processing on the current target sector RSC of the second track STR1 (the target sector RSC which the write head WHD currently faces), and the processing proceeds to step STa6. In step STa5, the slip processing unit 68 resets the rotation standby counter RN to 0 (RN=0). The rotation standby counter RN is recorded in a memory inside the slip processing unit 68 or a memory inside the magnetic disk device 1 such as the nonvolatile memory 90. On the other hand, a state is the rotation standby state (NO in step STa4), the processing proceeds to step STa6 without proceeding to step STa5.

Next, in step STa6, the current sector number SN of the second track STR1 is incremented, and thereafter, the processing proceeds to step STa7, and the final target sector RSC of the second track STR1 is determined. When it is not the final target sector RSC of the second track STR1, the processing proceeds to step STa2. On the other hand, in the case of the final target sector RSC of the second track STR1, the write processing on the current second track STR1 is ended.

When it is determined in step STa3 that the error correction performed on the first track STR0 reaches the limit (YES in step STa3), the processing proceeds to step STa8, the slip processing unit 68 executes the slip processing, registers data corresponding to the remaining empty sectors ESC in an alternate region (for example, the media cache M), and ends the write processing on the second track STR1.

Next, step STa7 in FIG. 19 will be described in detail.

As illustrated in FIG. 20, when the processing proceeds to step STa7, first, in step STa11, it is determined whether or not the current sector number SN of the second track STR1 is the number (G-1) of the final target sector RSC. When the sector number SN is not the number (G-1) (NO in step STa11), the processing proceeds to step STa2.

On the other hand, when the sector number SN is the number (G-1) (YES in step STa11), the processing proceeds to step STa12. When a state is not the rotation standby state (YES in step STa12), the write processing on the second track STR1 ends. When a state is the rotation standby state (NO in step STa12), the processing proceeds to step STa13, the sector number SN is reset (initialized) to 0, and the processing proceeds to step STa14.

When SN=0 is satisfied and the target for which the positioning error PE is detected returns to the head sector SC of the second track STR1, the slip processing unit 68 increments the rotation standby counter RN in step STa14. Thereafter, the processing proceeds to step STa15, and the slip processing unit 68 determines whether or not the rotation standby counter RN reaches an upper limit value RNL.

When the rotation standby counter RN does not reach the upper limit value RNL (NO in step STa15, RN<RNL), the processing proceeds to step STa2. On the other hand, when the rotation standby counter RN reaches the upper limit value RNL (YES in step STa15, RN=RNL), the processing proceeds to step STa8. The upper limit value RNL is, for example, three. However, the upper limit value RNL is not limited to three, and may be any numerical value of natural numbers.

Since this write processing method has a path from step STa15 to step STa8, it is possible to eliminate a state in which the error correction mode in track units remains invalid for a long time. Since it is not necessary to continuously perform the rotation standby of the disk DK three times (RNL times) or more in order to perform the write processing on the second track STR1, it is possible to avoid a situation in which the transfer speed of the write data to the second track STR1 is significantly reduced.

Next, step STa2 in FIG. 19 will be described in detail.

FIG. 21 is a diagram for describing the write processing according to the first embodiment, and is a flowchart for describing in detail still another part of the steps of the flowchart illustrated in FIG. 19.

As illustrated in FIG. 21, when the processing proceeds to step STa2, first, in step STb1, the correction limit prediction unit 65 calculates the increase rate of the number of damaged target sectors CSC. The increase rate when the correction limit prediction unit 65 determines that the damaged target sector CSC occurs in the first track STR0 for the first time is 1/n, and the increase rate when the correction limit prediction unit 65 determines that the damaged target sector CSC occurs in the first track STR0 for the second time or later is 1/p.

As described above, n indicates the number of target sectors RSC to which data is written until it is determined that the damaged target sector CSC first occurs in the second track STR1 after data is first written to the second track STR1 during the write period. Furthermore, p indicates the number of target sectors RSC to which data is written until it is determined that the damaged target sector CSC finally occurs in the first track STR0 after it is previously determined that the damaged target sector CSC occurs in the first track STR0.

In a case where it is determined that the damaged target sector CSC does not occur in the first track STR0, the increase rate is zero.

Subsequently, in step STb2, the correction limit prediction unit 65 calculates a prediction value (H1$p$) for the number of damaged target sectors CSC in a case where it is assumed that data is written to all the target sectors RSC of the first track STR0. The prediction value when the correction limit prediction unit 65 determines that the damaged target sector CSC occurs in the first track STR0 for the first time is $\{(G-n)/n\}+1$, and the prediction value when the correction limit prediction unit 65 determines that the damaged target sector CSC occurs in the first track STR0 for the second time or later is $\{(G-q)/p\}+v$.

In a case where it is determined that the damaged target sector CSC does not occur in the first track STR0, the prediction value is zero (H1$p$=0).

Next, in step STb3, the determination unit 66 determines whether or not the current valid flag FTE of the error correction mode is 1. In a case where the error correction mode is the valid mode (YES in step STb3), the processing proceeds to step STb4, and the correction limit prediction unit determines whether or not the prediction value (H1$p$) exceeds the first threshold H1. In a case where the prediction value (H1$p$) does not exceed the first threshold H1 (H1$p \le$H1, NO in step STb4), the processing proceeds to step STb9.

In step STb9, when both the case of the rotation standby state and the case where the current target sector RSC of the second track STR1 is the target sector RSC to which data is to be written next do not apply, or when only one of the two cases applies (NO in step STb9), the processing proceeds to step STa3.

On the other hand, in a case where a state is the rotation standby state, and the current target sector RSC of the second track STR1 is the target sector RSC to which data is to be written next (YES in step STb9), the processing proceeds to step STb10, the rotation standby state is released (FWT=0), and the processing proceeds to step STa3.

In step STb4, in a case where the prediction value (H1$p$) exceeds the first threshold H1 (H1$p$>H1, YES in step STb4), the processing proceeds to step STb6, the switching unit 67 switches the error correction mode to the invalid mode (FTE=0) and proceeds to step STb7, and the write processing unit 62 switches to the rotation standby mode (FWT=1) and proceeds to step STa3.

In step STb3, in a case where the error correction mode is the invalid mode (NO in step STb3), the processing proceeds to step STb5, and the correction limit prediction unit determines whether or not the prediction value (H$p$) exceeds the first threshold H1. In a case where the prediction value (H1$p$) exceeds the first threshold H1 (H1$p$>H1, YES in step STb5), the current write processing is maintained, and the processing proceeds to step STa3.

On the other hand, in a case where the prediction value (H1$p$) does not exceed the first threshold H1 (H1$p \le$H1, NO in step STb5), the processing proceeds to step STb8, the switching unit 67 returns the error correction mode to the valid mode (FTE=1), and the processing proceeds to step STa3. As described above, the timing when the error correction mode is returned to the valid mode may be in the middle of the rotation standby period, and the error correction mode can be returned at any time.

Next, step STa3 in FIG. 19 will be described in detail.

FIG. 22 is a diagram for describing the write processing according to the first embodiment, and is a flowchart for describing in detail another part of the steps of the flowchart illustrated in FIG. 19.

As illustrated in FIG. 22, when the processing proceeds to step STa3, first, in step STc1, the correction limit prediction unit 65 determines whether or not the positioning error PE exceeds the track margin TM. When the positioning error PE does not exceed the track margin TM (PE$\le$TM, NO in step STc1), the processing proceeds to step STa4.

On the other hand, when the positioning error PE exceeds the track margin TM (PE>TM, YES in step STc1), the processing proceeds to step STc2, and the correction limit prediction unit 65 increments the number $v$ of damaged target sectors CSC that occur in the first track STR0. Thereafter, in step STc3, the correction limit prediction unit 65 determines whether or not the number $v$ of damaged target sectors CSC reaches the first threshold H1.

In a case where the number $v$ of damaged target sectors CSC reaches the first threshold H1 (YES in step STc3), the processing proceeds to step STa8. On the other hand, in a case where the number $v$ of damaged target sectors CSC does not reach the first threshold H1 ($v$<H1, NO in step STc3), the processing proceeds to step STa4.

The write processing method can be implemented according to the flowcharts illustrated in FIGS. 19 to 22.

In the magnetic disk device 1 and the write processing method according to the first embodiment configured as described above, the magnetic disk device 1 includes the disk DK, the write head WHD, the write processing unit 62, the error correction unit 64, the correction limit prediction unit 65, and the determination unit 66. The error correction unit 64 can execute error correction of the data of the damaged target sector CSC in which the data is determined to be damaged among a plurality of the target sectors RSC of each of the first track STR0 and the second track STR1. Here, attention is paid to a write period during which the write processing is executed on a plurality of the target sectors RSC of the first track STR0 and then the write processing is executed on a plurality of the target sectors RSC of the second track STR1.

During this write period, the correction limit prediction unit 65 can determine whether or not the data of each of the target sectors RSC of the first tracks STR0 is damaged (whether or not the positioning error PE exceeds the track margin TM). Then, the correction limit prediction unit 65 can generate prediction information that is information for predicting whether or not the error correction performed on the first track STR0 reaches the limit until the write processing on all the target sectors RSC of the second track STR1 is completed. During the write period, the determination unit 66 can determine whether or not to cause the write processing unit 62 to continue the write processing on the second track STR1 based on the prediction information.

Thus, before the number of damaged target sectors CSC of the first track STR0 reaches the limit (the first threshold H1), the determination unit 66 can determine whether to continue the write processing on the second track STR1, stop the write processing, or execute the slip processing.

Since there is an option for continuing the write processing, it is possible to suppress a decrease in the write performance of the magnetic disk device 1. Since there is an option for suspending the write processing, it is possible to cause the disk DK to enter the rotation standby state, which can suppress a decrease in write performance of the slip processing. When the rotation standby state is released, the write processing on the second track STR1 can be resumed. Therefore, the utilization efficiency of the second track STR1 can be enhanced. Since there is an option for executing the slip processing, it is possible to avoid a situation in which the number of damaged target sectors CSC of the first track STR0 exceeds the limit.

As described above, it is possible to obtain the magnetic disk device 1 capable of predicting whether or not the error correction performed on the track TR of the disk DK reaches the limit.

Furthermore, it is possible to obtain the magnetic disk device 1 capable of enhancing the utilization efficiency of the track TR.

Second Embodiment

Next, a second embodiment will be described. A magnetic disk device 1 is configured similarly to the magnetic disk device 1 of the first embodiment except for a configuration to be described in the second embodiment. A write processing method is similar to the procedure of the write processing method of the first embodiment except for a procedure described in the second embodiment.

First, the write processing method according to the second embodiment will be described in detail.

As illustrated in FIGS. 1 and 23, a correction limit prediction unit 65 can determine whether or not the sum H2*p* of excessive amounts to be described later exceeds a second threshold H2 instead of determining whether or not the final number H1*p* of damaged target sectors CSC predicted to occur in a first track STR0 exceeds a first threshold H1.

The correction limit prediction unit 65 may determine whether or not the prediction information is the normality information or the abnormality information at an early stage when it is determined that the damaged target sector CSC first occurs in the first track STR0.

Here, attention is paid to a write period during which the write processing is executed on a plurality of the target sectors RSC of the first track STR0 and then the write processing is executed on a plurality of the target sectors RSC of the second track STR1.

During the write period, the correction limit prediction unit 65 can calculate the excessive amount in which the position of a write head WHD protrudes from a reference radial position PTM in a first direction Da every time data is written to target sectors RSC of the second tracks STR1, and can update the sum of the excessive amounts during the write period. When the sum reaches a second threshold H2, the correction limit prediction unit 65 predicts that the error correction performed on the first track STR0 has reached the limit. The second threshold H2 is the upper limit value of the sum of the excessive amounts in which an error correction unit 64 can execute error correction in the first track STR0.

Here, the number of all the target sectors RSC of the second track STR1 is set to G, the second threshold H2 is set to H2. During the write period, the number of target sectors RSC to which data is written until it is determined that the position of the write head WHD first protrudes from the reference radial position PTM in the first direction Da after data is first written to the second track STR1 is set to n, and the excessive amount when it is determined that the position of the write head WHD first protrudes from the reference radial position PTM in the first direction Da is set to w.

Formulas 5 and 6 are as follows.

$$H2 \geq \{(w/n)\cdot(G-n)\} + w \qquad \text{(Formula 5)}$$

$$H2 < \{(w/n)\cdot(G-n)\} + w \qquad \text{(Formula 6)}$$

During the write period, when the correction limit prediction unit 65 determines that the position of the write head WHD does not protrude from the reference radial position PTM in the first direction Da, a switching unit 67 can maintain an error correction mode in a valid mode.

On the other hand, during the write period, when it is first determined that the position of the write head WHD protrudes from the reference radial position PTM in the first direction Da, the switching unit 67 processes the error correction mode as follows. That is, in a case where the correction limit prediction unit 65 generates normality information corresponding to Formula 5, the switching unit 67 can maintain the error correction mode in the valid mode. On the other hand, in a case where the correction limit prediction unit 65 generates abnormality information corresponding to Formula 6, the switching unit 67 can switch the error correction mode to the invalid mode.

As described above, the correction limit prediction unit 65 can determine at an early stage whether or not the prediction information is the normality information or the abnormality information. However, since a first excessive amount w is significantly smaller than the second threshold H2 (w<<H2), the determination regarding the prediction information at the time when it is determined that the damaged target sector CSC first occurs in the first track STR0 may not be performed, and the write processing may be continued.

The correction limit prediction unit 65 can determine whether the prediction information is the normality information or the abnormality information when a plurality of the damaged target sectors CSC occurs in the first track STR0. The correction limit prediction unit 65 may start the above-described determination after two damaged target sectors CSC occur in the first track STR0, or may start the above-described determination after three damaged target sectors CSC occur in the first track STR0.

Here, during the write period, the number of target sectors RSC to which data is written until it is determined that the position of the write head WHD finally protrudes from the reference radial position PTM in the first direction Da after it is determined that the position of the write head WHD previously protrudes from the reference radial position PTM in the first direction Da is set to p. The number of target sectors RSC to which data is written until it is determined that the position of the write head WHD finally protrudes from the reference radial position PTM in the first direction Da after data is first written to the second track STR1 is set to q.

The excessive amount w when it is determined that the position of the write head WHD finally protrudes from the reference radial position PTM in the first direction Da is set to f. The sum of the excessive amounts obtained until it is determined that the position of the write head WHD finally protrudes from the reference radial position PTM in the first direction Da is set to k.

Formulas 7 and 8 are as follows.

$$H2 \geq \{(f/p)\cdot(G-q)\} + k \qquad \text{(Formula 7)}$$

$$H2 < \{(f/p)\cdot(G-q)\} + k \qquad \text{(Formula 8)}$$

During the write period, when the correction limit prediction unit 65 determines that the position of the write head WHD does not protrude from the reference radial position PTM in the first direction Da, a switching unit 67 can maintain an error correction mode in a valid mode.

On the other hand, during the write period, when it is determined that the position of the write head WHD protrudes from the reference radial position PTM in the first direction Da for the second time or later, the switching unit 67 processes the error correction mode as follows. That is, in a case where the correction limit prediction unit 65 generates normality information corresponding to Formula 7, the switching unit 67 can maintain the error correction mode in the valid mode. On the other hand, in a case where the correction limit prediction unit 65 generates abnormality information corresponding to Formula 8, the switching unit 67 can switch the error correction mode to the invalid mode.

Next, a specific example of the write processing method according to the second embodiment described above will be described.

FIG. 23 is a schematic diagram illustrating an example of a first track STR0 and a second track STR1 of the magnetic disk device 1 according to the second embodiment, is a diagram for describing write processing on the first track STR0 and the second track STR1, and is a diagram for describing a state in which the write processing on the second track STR1 is continued until the sum H2$p$ of the excessive amounts w for the write head WHD reaches the second threshold H2 or more and the write processing on the second track STR1 ends when the sum H2$p$ thereof is the second threshold H2 or more. Also in FIG. 23, for convenience of description, the first track STR0 and the like are drawn assuming that the circumferential direction is linear. FIG. 24 is a graph illustrating a change in the sum H2$p$ on the first track STR0 of FIG. 23.

As illustrated in FIGS. 23 and 24, the write processing on the first track STR0 is ideally executed without the positioning error PE (PE≈0 or PE=0).

In a case where the magnetic disk device 1 vibrates, when the write processing on the second track STR1 is executed, the damaged target sector CSC may occur in the first track STR0.

When one damaged target sector CSC occurs in the first track STR0 or when a plurality of the damaged target sectors CSC occur, the correction limit prediction unit 65 can predict whether or not the sum H2$p$ exceeds the second threshold H2 based on the increase rate of the excessive amount w.

Next, the write processing method according to the second embodiment will be described with reference to the flowchart. FIG. 25 is a diagram for describing the write processing according to the second embodiment, and is a flowchart for describing in detail another part of the steps of the flowchart illustrated in FIG. 19. FIG. 26 is a diagram for describing the write processing according to the second embodiment, and is a flowchart for describing in detail another part of the steps of the flowchart illustrated in FIG. 19.

First, step STa2 in FIG. 19 will be described in detail.

As illustrated in FIG. 25, when the processing proceeds to step STa2, first, in step STd1, the correction limit prediction unit 65 calculates the increase rate of the excessive amount w. The increase rate when the correction limit prediction unit 65 determines that the damaged target sector CSC occurs in the first track STR0 for the first time is w/n, and the increase rate when the correction limit prediction unit 65 determines that the damaged target sector CSC occurs in the first track STR0 for the second time or later is f/p.

In a case where it is determined that the position of the write head WHD does not protrude from the reference radial position PTM in the first direction Da, the increase rate is zero.

Subsequently, in step STd2, the correction limit prediction unit 65 calculates a prediction value (H2$p$) for the sum of the excessive amounts w in a case where it is assumed that data is written to all the target sectors RSC of the first track STR0. The prediction value when the correction limit prediction unit 65 determines that the damaged target sector CSC occurs in the first track STR0 for the first time is {(w/n)·(G−n)}+w, and the prediction value when the correction limit prediction unit 65 determines that the damaged target sector CSC occurs in the first track STR0 for the second time or later is {(f/p)·(G−q)}+k.

In a case where it is determined that the position of the write head WHD does not protrude from the reference radial position PTM in the first direction Da, the prediction value is zero (H2$p$=0).

Next, in step STd3, a determination unit 66 determines whether or not the current valid flag FTE of the error correction mode is 1. In a case where the error correction mode is the valid mode (YES in step STd3), the processing proceeds to step STd4, and the correction limit prediction unit 65 determines whether or not the prediction value (H2$p$) exceeds the second threshold H2. In a case where the prediction value (H2$p$) does not exceed the second threshold H2 (H2$p$≤ H2, NO in step STd4), the processing proceeds to step STd9.

In step STd9, when both the case of the rotation standby state and the case where the current target sector RSC of the second track STR1 is the target sector RSC to which data is to be written next do not apply, or when only one of the two cases applies (NO in step STd9), the processing proceeds to step STa3.

On the other hand, in a case where a state is the rotation standby state, and the current target sector RSC of the second track STR1 is the target sector RSC to which data is to be written next (YES in step STd9), the processing proceeds to step STd10, the rotation standby state is released (FWT=0), and the processing proceeds to step STa3.

In step STd4, in a case where the prediction value (H2$p$) exceeds the second threshold H2 (H2$p$>H2, YES in step STd4), the processing proceeds to step STd6, the switching unit 67 switches the error correction mode to the invalid mode (FTE=0) and proceeds to step STd7, and a write processing unit 62 switches to the rotation standby mode (FWT=1) and proceeds to step STa3.

In step STd3, in a case where the error correction mode is the invalid mode (NO in step STd3), the processing proceeds to step STd5, and the correction limit prediction unit 65 determines whether or not the prediction value (H2$p$) exceeds the second threshold H2. In a case where the prediction value (H2$p$) exceeds the second threshold H2 (H2$p$>H2, YES in step STd5), the current write processing is maintained, and the processing proceeds to step STa3.

On the other hand, in a case where the prediction value (H2$p$) does not exceed the second threshold H2 (H2$p$≤H2, NO in step STd5), the processing proceeds to step STd8, the switching unit 67 returns the error correction mode to the valid mode (FTE=1), and the processing proceeds to step STa3. As described above, the timing when the error correction mode is returned to the valid mode may be in the middle of the rotation standby period, and the error correction mode can be returned at any time.

Next, step STa3 in FIG. 19 will be described in detail.

As illustrated in FIG. 26, when the processing proceeds to step STa3, first, in step STe1, the correction limit prediction unit 65 determines whether or not the positioning error PE exceeds the track margin TM. When the positioning error PE does not exceed the track margin TM (PE≤TM, NO in step STe1), the processing proceeds to step STa4.

On the other hand, when the positioning error PE exceeds the track margin TM (PE>TM, YES in step STe1), the processing proceeds to step STe2, and the correction limit prediction unit 65 updates the sum H2$p$ of the excessive amounts w. Here, (PE-TM) in step STe2 is the excessive amount w obtained when the determination in step STe1 is made. Thereafter, in step STe3, the correction limit prediction unit 65 determines whether the sum H2*p* of the excessive amounts w reaches the second threshold H2.

In a case where the sum H2*p* reaches the second threshold H2 (YES in step STe3), the processing proceeds to step STa8. On the other hand, in a case where the sum H2*p* does not reach the second threshold H2 (H2*p*<H2, NO in step STe3), the processing proceeds to step STa4.

The write processing method according to the second embodiment can be implemented according to the flowcharts illustrated in FIGS. 19, 20, 25, and 26.

Even in the magnetic disk device 1 and the write processing method according to the second embodiment configured as above, the same effect as that of the first embodiment described above can be obtained. As described above, it is possible to obtain the magnetic disk device 1 capable of predicting whether or not the error correction performed on the track TR of the disk DK reaches the limit. Furthermore, it is possible to obtain the magnetic disk device 1 capable of enhancing the utilization efficiency of the track TR.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. It is also possible to combine a plurality of the embodiments as necessary.

For example, the technology described above is not limited to a hybrid recording magnetic disk device, and may be applied to a shingled magnetic recording magnetic disk device or may be applied to a conventional magnetic recording magnetic disk device.

What is claimed is:

1. A magnetic disk device comprising:

a disk that has a first data track and a second data track adjacent to each other in a recording layer, the first data track and the second data track each including a plurality of target sectors to which data is to be written; a write head that writes data to the recording layer of the disk;

a write processing unit that is capable of executing write processing of writing data to the recording layer;

an error correction unit that executes error correction on data in track units and executes error correction on data of a damaged target sector in which data is determined to be damaged among the plurality of target sectors on the first data track;

a correction limit prediction unit; and a determination unit, during a write period in which the write processing is executed on the plurality of target sectors of the second data track after the write processing is executed on the plurality of target sectors of the first data track, the correction limit prediction unit being capable of determining whether or not data of each of the plurality of target sectors of the first data track is damaged, and generating prediction information that is information for predicting whether or not the error correction performed on the first data track reaches a limit until the write processing on all the target sectors of the second data track is completed, the determination unit determining whether or not to cause the write processing unit to continue the write processing on the second data track based on the prediction information.

2. The magnetic disk device according to claim 1, further comprising:

a switching unit that is capable of setting a valid mode that enables an error correction mode performed in the track units by the error correction unit, wherein during the write period, in a case where the prediction information is normality information for predicting that the error correction does not reach the limit, the switching unit sets the error correction mode to the valid mode, and the determination unit causes the write processing unit to continue the write processing on the second data track.

3. The magnetic disk device according to claim 2, wherein the switching unit is capable of switching the error correction mode to the valid mode or an invalid mode that disables the error correction mode, and during the write period, in a case where the prediction information is switched to abnormality information for predicting that the error correction reaches the limit, the switching unit switches the error correction mode to the invalid mode, and the determination unit causes the write processing unit to suspend the write processing on the second data track.

4. The magnetic disk device according to claim 3, further comprising:

an arm that supports the write head; and an actuator that moves the arm, wherein during the write period, when the error correction mode is switched to the invalid mode, the write processing unit suspends the write processing on the second data track, drives the actuator to maintain a position of the write head in a radial direction of the disk, maintains a rotation standby state of the disk, and then transitions to write retry operation of resuming the write processing.

5. The magnetic disk device according to claim 4, wherein in a case where the prediction information is switched to the normality information after the write processing unit transitions to the write retry operation, the switching unit switches the error correction mode to the valid mode, and the determination unit causes the write processing unit to resume the write processing on the second data track.

6. The magnetic disk device according to claim 4, wherein during the write period, the correction limit prediction unit manages the number of one or more damaged target sectors in which data is determined to be damaged among the plurality of target sectors of the first data track, when the number of the one or more damaged target sectors reaching a first threshold, the correction limit prediction unit predicts that the error correction performed on the first data track has reached the limit, and in a case where the number of all the target sectors of the second data track is set to G, the first threshold is set to H1, during the write period, the number of the target sectors to which data is written is set to n, the data being written until it is determined that the damaged target sector first occurs in the first data track after the data is first written to the second data track, Formula 1 is represented by $H1 \geq \{(G-n)/n\}+1$, and Formula 2 is represented by $H1 < \{(G-n)/n\}+1$, during the write period, when the correction limit prediction unit determines that the damaged target sector does not occur in the first data track, the switching unit maintains the error correction mode in the valid mode, or during the write period, when the correction limit prediction unit first determines that the damaged target sector occurs in the first data track, in a case where the correction limit prediction unit generates the normality information corresponding to Formula 1, the switching unit maintains the error correction mode in the valid mode, or in a case where the correction limit prediction unit generates the abnormality information corresponding to Formula 2, the switching unit switches the error correction mode to the invalid mode.

7. The magnetic disk device according to claim 4, wherein during the write period, the correction limit prediction unit manages the number of one or more damaged target sectors in which data is determined to be damaged among the plurality of target sectors of the first data track, when the number of the one or more damaged target sectors reaching a first threshold, the correction limit prediction unit predicts that the error correction performed on the first data track has reached the limit, and in a case where the number of all the target sectors of the second data track is set to G, the first threshold is set to H1, during the write period, the number of the target sectors to which data is written is set to p, the data being written until it is determined that the damaged target sector finally occurs in the first data track after it is determined that the damaged target sector previously occurs in the first data track, the number of the target sectors to which data is written is set to q, the data being written until it is determined that the damaged target sector finally occurs in the first data track after data is first written to the second data track, the number of the damaged target sectors in which data is determined to be damaged is set to v, the data being determined to be damaged until it is determined that the damaged target sector occurs finally in the first data track, Formula 3 is represented by $H1 \geq \{(G-q)/p\}+v$, and Formula 4 is represented by $H1 < \{(G-q)/p\}+v$, during the write period, when the correction limit prediction unit determines that the damaged target sector does not occur in the first data track, the switching unit maintains the error correction mode in the valid mode, or during the write period, when the correction limit prediction unit determines for the second time or later that the damaged target sector occurs in the first data track, in a case where the correction limit prediction unit generates the normality information corresponding to Formula 3, the switching unit maintains the error correction mode in the valid mode, or in a case where the correction limit prediction unit generates the abnormality information corresponding to Formula 4, the switching unit switches the error correction mode to the invalid mode.

8. The magnetic disk device according to claim 1, wherein during the write period, the correction limit prediction unit manages the number of one or more damaged target sectors in which data is determined to be damaged among the plurality of target sectors of the first data track, and when the number of the one or more damaged target sectors reaching a first threshold, the correction limit prediction unit predicts that the error correction performed on the first data track has reached the limit.

9. The magnetic disk device according to claim 8, wherein the first threshold is an upper limit value of the number of the one or more damaged target sectors on which the error correction is capable of being executed by the error correction unit in the first data track.

10. The magnetic disk device according to claim 4, wherein the first data track is located in a first direction as viewed from the second data track in a direction parallel to the radial direction of the disk, during the write period, the correction limit prediction unit calculates an excessive amount in which the position of the write head protrudes from a reference radial position in the first direction every time data is written to each of the plurality of target sectors of the second data track, and updates a sum of the excessive amounts during the write period, when the sum reaching a second threshold, the correction limit prediction unit predicts that the error correction performed on the first data track has reached the limit, and in a case where the number of all the target sectors of the second data track is set to G, the second threshold is set to H2, during the write period, the number of the target sectors to which data is written is set to n, the data being written until it is determined that the position of the write head first protrudes from the reference radial position in the first direction after data is first written to the second data track, the excessive amount when it is determined that the position of the write head first protrudes from the reference radial position in the first direction is set to w, Formula 5 is represented by $H2 \geq \{(w/n)\cdot(G-n)\}+w$, and Formula 6 is represented by $H2 < \{(w/n)\cdot(G-n)\}+w$, during the write period, when the correction limit prediction unit determines that the position of the write head does not protrude from the reference radial position in the first direction, the switching unit maintains the error correction mode in the valid mode, or during the write period, when the correction limit prediction unit first determines that the position of the write head protrudes from the reference radial position in the first direction, in a case where the correction limit prediction unit generates the normality information corresponding to Formula 5, the switching unit maintains the error correction mode in the valid mode, or in a case where the correction limit prediction unit generates the abnormality information corresponding to Formula 6, the switching unit switches the error correction mode to the invalid mode.

11. The magnetic disk device according to claim 4, wherein the first data track is located in a first direction as viewed from the second data track in a direction parallel to the radial direction of the disk, during the write period, the correction limit prediction unit calculates an excessive amount in which the position of the write head protrudes from a reference radial position in the first direction every time data is written to each of the plurality of target sectors of the second data track, and updates a sum of the excessive amounts during the write period, when the sum reaching a second threshold, the correction limit prediction unit predicts that the error correction performed on the first data track has reached the limit, and in a case where the number of all the target sectors of the second data track is set to G, the second threshold is set to H2, during the write period, the number of the target sectors to which data is written is set to p, the data being written until it is determined that the position of the write head finally protrudes from the reference radial position in the first direction after it is determined that the position of the write head previously protrudes from the reference radial position in the first direction, the number of the target sectors to which data is written is set to q, the data being written until it is determined that the position of the write head finally protrudes from the reference radial position in the first direction after data is first written to the second data track, the excessive amount when it is determined that the position of the write head finally protrudes from the reference radial position in the first direction is set to f, a sum of the excessive amounts until it is determined that the position of the write head finally protrudes from the reference radial position in the first direction is set to k, Formula 7 is represented by $H2 \geq \{(f/p) \cdot (G-q)\} + k$, and Formula 8 is represented by $H2 < \{(f/p) \cdot (G-q)\} + k$, during the write period, when the correction limit prediction unit determines that the position of the write head does not protrude from the reference radial position in the first direction, the switching unit maintains the error correction mode in the valid mode, or during the write period, when the correction limit prediction unit determines for the second time or later that the position of the write head protrudes from the reference radial position in the first direction, in a case where the correction limit prediction unit generates the normality information corresponding to Formula 7, the switching unit maintains the error correction mode in the valid mode, or in a case where the correction limit prediction unit generates the abnormality information corresponding to Formula 8, the switching unit switches the error correction mode to the invalid mode.

12. The magnetic disk device according to claim 1, wherein the first data track is located in a first direction as viewed from the second data track in a direction parallel to a radial direction of the disk, during the write period, the correction limit prediction unit calculates an excessive amount in which a position of the write head protrudes from a reference radial position in the first direction every time data is written to each of the plurality of target sectors of the second data track, and updates a sum of the excessive amounts during the write period, and when the sum reaching a second threshold, the correction limit prediction unit predicts that the error correction performed on the first data track has reached the limit.

13. The magnetic disk device according to claim 12, wherein the second threshold is an upper limit value of the sum of the excessive amounts in which the error correction is capable of being executed by the error correction unit in the first data track.

14. The magnetic disk device according to claim 1, wherein the first data track is located in a first direction as viewed from the second data track in a direction parallel to a radial direction of the disk, and during the write period, when a position of the write head protrudes from a reference radial position in the first direction, the correction limit prediction unit determines a target sector adjacent to the write head in the first direction among the plurality of target sectors of the first data track as the damaged target sector.

15. The magnetic disk device according to claim 1, further comprising:

an arm that supports the write head;

an actuator that moves the arm; and a slip processing unit, wherein when the determination unit determines that the error correction performed on the first data track reaches the limit before data is written to all the target sectors of the second data track, the write processing unit ends the write processing on the second data track, the plurality of target sectors of the second data track are classified into a plurality of target sectors on which the write processing is executed and which belong to a first group and one or more target sectors on which the write processing is not executed and which belong to a second group, and the slip processing unit drives the actuator to cause a position of the write head in a radial direction of the disk to face a third data track of the disk, and executes slip processing of writing data corresponding to the one or more target sectors belonging to the second group to the third data track.

16. The magnetic disk device according to claim 1, further comprising:

a memory; and a slip processing unit, wherein when the determination unit determines that the error correction performed on the first data track reaches the limit before data is written to all the target sectors of the second data track, the write processing unit ends the write processing on the second data track, the plurality of target sectors of the second data track are classified into a plurality of target sectors on which the write processing is executed and which belong to a first group and one or more target sectors on which the write processing is not executed and which belong to a second group, and the slip processing unit executes slip processing of writing data correspond-ing to the one or more target sectors belonging to the second group to the memory.

17. The magnetic disk device according to claim 1, wherein the write processing unit is capable of selecting a shingled magnetic recording mode in which write is performed by overlapping data of the second data track with data of the first data track in an overwriting direction parallel to a radial direction of the disk.

18. A magnetic disk device comprising:

a disk that has a first data track and a second data track adjacent to each other in a recording layer, the first data track and the second data track each including a plu-rality of target sectors to which data is to be written;

a write head that writes data to the recording layer of the disk;

a write processing unit that is capable of executing write processing of writing data to the recording layer;

an error correction unit that executes error correction on data of a damaged target sector in which data is determined to be damaged among the plurality of target sectors on the first data track;

a switching unit that is capable of setting a valid mode that enables an error correction mode performed in track units by the error correction unit;

a correction limit prediction unit; and a determination unit, during a write period in which the write processing is executed on the plurality of target sectors of the second data track after the write processing is executed on the plurality of target sectors of the first data track, the correction limit prediction unit being capable of determining whether or not data of each of the plurality of target sectors of the first data track is damaged, and generating prediction information that is informa-tion for predicting whether or not the error correction performed on the first data track reaches a limit until the write processing on all the target sectors of the second data track is completed, the determination unit determining whether or not to cause the write processing unit to continue the write processing on the second data track based on the prediction information, during the write period, in a case where the prediction information is normality information for predicting that the error correction does not reach the limit, the switching unit that sets the error correction mode to the valid mode, and the determination unit that causes the write process-ing unit to continue the write processing on the second data track.

* * * * *